United States Patent
French

(10) Patent No.: US 8,153,866 B2
(45) Date of Patent: Apr. 10, 2012

(54) CORN INBREDS LIKE FAR045 AND HYBRIDS THEREOF

(75) Inventor: Lee K. French, Lamberton, MN (US)

(73) Assignee: Suntava LLC, Afton, MN (US)

(*) Notice: Subject to any disclaimer, the term of this patent is extended or adjusted under 35 U.S.C. 154(b) by 602 days.

(21) Appl. No.: 12/143,159

(22) Filed: Jun. 20, 2008

(65) Prior Publication Data

US 2009/0007292 A1 Jan. 1, 2009

Related U.S. Application Data

(60) Provisional application No. 60/945,430, filed on Jun. 21, 2007.

(51) Int. Cl.
*A01H 1/00* (2006.01)
*A01H 5/00* (2006.01)
*A01H 5/10* (2006.01)
*C12N 15/82* (2006.01)

(52) U.S. Cl. .......... 800/320.1; 435/412; 800/275; 800/300.1; 800/302; 800/301

(58) Field of Classification Search .................. None
See application file for complete search history.

(56) References Cited

U.S. PATENT DOCUMENTS

| | | |
|---|---|---|
| 3,861,709 A | 1/1975 | Mulcahy et al. |
| 3,963,700 A | 6/1976 | Philip |
| 4,105,675 A | 8/1978 | Iacobucci et al. |
| 4,211,577 A | 7/1980 | Wallin |
| 4,302,200 A | 11/1981 | Yokoyama et al. |
| 4,320,009 A | 3/1982 | Hilton et al. |
| 4,481,226 A | 11/1984 | Crosby et al. |
| 4,500,556 A | 2/1985 | Langston |
| 4,581,847 A | 4/1986 | Hibberd et al. |
| 4,654,465 A | 3/1987 | Brar et al. |
| 4,727,219 A | 2/1988 | Brar et al. |
| 4,769,061 A | 9/1988 | Comai |
| 4,810,648 A | 3/1989 | Stalker |
| 4,936,904 A | 6/1990 | Carlson |
| 4,940,835 A | 7/1990 | Shah et al. |
| 4,975,374 A | 12/1990 | Goodman et al. |
| 4,999,423 A | 3/1991 | Idaka |
| 5,134,074 A | 7/1992 | Gordon et al. |
| 5,266,317 A | 11/1993 | Tomalski et al. |
| 5,302,523 A | 4/1994 | Coffee et al. |
| 5,371,003 A | 12/1994 | Murray et al. |
| 5,384,253 A | 1/1995 | Krzyzek et al. |
| 5,432,068 A | 7/1995 | Albertsen et al. |
| 5,445,961 A | 8/1995 | Genovesi et al. |
| 5,550,318 A | 8/1996 | Adams et al. |
| 5,569,597 A | 10/1996 | Grimsley et al. |
| 5,591,616 A | 1/1997 | Hiei et al. |
| 5,689,051 A | 11/1997 | Cigan et al. |
| 5,736,369 A | 4/1998 | Bowen et al. |
| 5,767,367 A | 6/1998 | Dudits et al. |
| 5,776,900 A | 7/1998 | Bhatnagar et al. |
| 5,780,708 A | 7/1998 | Lundquist et al. |
| 5,780,709 A | 7/1998 | Adams et al. |
| 5,789,214 A | 8/1998 | Ryals et al. |
| 5,886,244 A | 3/1999 | Tomes et al. |
| 5,919,675 A | 7/1999 | Adams et al. |
| 5,932,782 A | 8/1999 | Bidney |
| 5,981,840 A | 11/1999 | Zhao et al. |
| 5,990,387 A | 11/1999 | Tomes et al. |
| 5,990,390 A | 11/1999 | Lundquist et al. |
| 5,994,624 A | 11/1999 | Trolinder et al. |
| 6,132,791 A | 10/2000 | Fox |
| 6,238,673 B1 | 5/2001 | Howard |
| 6,573,432 B1 | 6/2003 | Borevitz et al. |
| 6,656,914 B2 | 12/2003 | Nair et al. |
| 6,686,517 B2 | 2/2004 | Koppert |
| 6,767,999 B2 | 7/2004 | Smirnov et al. |
| 6,780,422 B2 | 8/2004 | Brieva et al. |
| 6,822,144 B1 | 11/2004 | Zhao et al. |
| 7,178,285 B2 | 2/2007 | Miller et al. |
| 7,192,456 B2 | 3/2007 | Ichi et al. |
| 7,208,181 B1 | 4/2007 | King et al. |
| 7,211,413 B2 | 5/2007 | Matsumoto |
| 2001/0016573 A1 | 8/2001 | Nair et al. |
| 2002/0054924 A1 | 5/2002 | Leahy et al. |
| 2002/0055471 A1 | 5/2002 | Bailey et al. |
| 2004/0009249 A1 | 1/2004 | Hibasami et al. |
| 2004/0266999 A1 | 12/2004 | Kuriki et al. |
| 2005/0125915 A1 | 6/2005 | Ichi et al. |
| 2005/0208643 A1 | 9/2005 | Schmidt-Dannert et al. |
| 2006/0073220 A1 | 4/2006 | Daugherty et al. |

FOREIGN PATENT DOCUMENTS

| | | |
|---|---|---|
| JP | 59223756 | 12/1984 |
| JP | 2006067945 | 3/2006 |
| WO | WO 90/08828 | 8/1990 |
| WO | WO 93/02197 | 2/1993 |
| WO | WO 93/06487 | 4/1993 |
| WO | WO 95/16776 | 6/1995 |
| WO | WO 95/18855 | 7/1995 |
| WO | WO 96/30530 | 10/1996 |
| WO | WO 02/17732 | 3/2002 |
| WO | WO 03/080084 | 10/2003 |
| WO | WO 2008/070939 | 6/2008 |

OTHER PUBLICATIONS

Mazza, et al., III. Maize or Corn, in Anthocyanins in Fruits, Vegetables, and Grains, pp. 227-243, CRC Press, Ann Arbor, Michigan, 1993.*

Chandler, How Purple Corn and RNA Break Genetic Laws, University of Arizona Press Release, Jun. 19, 2006.

Coe et al., The Genetics of Corn, in Corn and Corn Improvement—Agronomy Monograph No. 18, 3rd Edition, pp. 81-257, ASA-CSSA-SSSA, Madison, Wisconsin, 1988.

Anonymous, Corn Ruby Queen Hybrid (SE), Burpee website advertisement containing reviewer comments as early as Jun. 10, 2006.

Salinas Moreno, et al. Extraction and use of pigments from maize grains (*Zea mays l.*) as colorants in yogur, Archivos Latinoamericanos de Nutricion 55 (3): 293-298 (Sep. 2005).

* cited by examiner

*Primary Examiner* — David H Kruse

(74) *Attorney, Agent, or Firm* — Mark A. Litman & Associates, P.A.

(57) ABSTRACT

A maize inbred line having the characteristics selected from those of FAR045, including plant parts, tissue, and pigments of the inbred is disclosed.

26 Claims, No Drawings

CORN INBREDS LIKE FAR045 AND HYBRIDS THEREOF

CROSS-REFERENCES TO RELATED APPLICATIONS

This application claims priority under 35 U.S.C. §119 (e) to, and hereby incorporates by reference, U.S. Provisional Application No. 60/945,430, filed Jun. 21, 2007. This application hereby incorporates by reference co-pending and concurrently filed U.S. application Ser. No. 12/214,773, entitled ANTHOCYANIN PIBMENT/DYE COMPOSITIONS AND METHOD OF PROVIDING COMPOSITION THROUGH EXTRACTION FROM CORN.

FIELD OF THE INVENTION

The present invention relates generally to the production of corn and particularly to the production of inbred corn lines having characteristically red colored plant parts and tissues exhibiting good pigment stability. The invention also relates to the use of the inbreds in the production of hybrid corn plants and parts and tissue of these hybrid corn plants and to methods of extracting these pigments from these tissues.

BACKGROUND OF THE INVENTION

Maize or corn (*Zea mays* L.) is a major annual crop species grown for grain and forage. A monocot, maize is a member of the grass family (Gramineae) and bears seeds in female inflorescences (usually called ears) and pollen in separate male inflorescences (usually called tassels).

In the U.S., maize is almost exclusively produced by growing hybrid varieties (cultivars). Maize hybrids are typically produced by seed companies and sold to farmers. On farms, maize hybrids are usually grown as a row crop. During the growing season herbicides are widely used to control weeds; fertilizers are used to maximize yields; and fungicides and insecticides are often used to control disease pathogens and insect pests. Before maturity, maize plants may be chopped and placed in storage where the chopped forage undergoes fermentation to become silage for livestock feed. At maturity in the fall, the seeds are harvested as grain. The grain may be directly fed to livestock or transported to storage facilities. From storage facilities, the grain is transported to be used in making an extremely large number of products, including food ingredients, pigments, snacks, pharmaceuticals, sweeteners, and paper products (see, e.g., S. A. Watson and P. E. Ramstad, Eds., Corn: Chemistry and Technology, American Association of Cereal Chemists, Inc., St. Paul, Minn. (1987)).

While the agronomic performance of maize hybrids has improved, there is a continuing need to develop better hybrids with increased and more dependable pigment and grain and stover yields. Moreover, heat and drought stress and continually changing insect pests and disease pathogens present hazards to farmers as they grow maize hybrids. Thus, there is a continual need for maize hybrids which offer higher grain yields in the presence of heat, drought, pathogens and insects.

In accordance with the present invention and in addition to the foregoing agronomic traits, an important characteristic of inbred lines and hybrid plants obtained using the inbred lines of this invention involves pigmentation, such as anthocyanins, the extraction thereof, and use.

SUMMARY OF THE INVENTION

By means of the present invention, there is provided inbred lines of corn having plant parts and tissues with high concentrations of a stable red coloration, which is uncharacteristic of known corn plants used commercially today. These desirable attributes are characterized by inbred corn lines such as FAR601 and FAR045.

One aspect of the invention involves the plant parts and tissue of these inbreds and the use of the plant parts and tissue of these inbred in the extraction and use of the red plant pigments associated with these inbreds and their hybrids.

Another aspect of the invention involves a process for producing seed of an inbred corn line including self-pollinating either of the inbreds FAR601 and FAR045, then harvesting seed. The invention also involves the seed produced by the process of inbreeding either of the inbred corn lines.

In addition, the invention involves a process for producing a hybrid corn plant utilizing at least one of the inbred corn lines FAR601 or FAR045. The process involves crossing a first inbred line with a non-identical second inbred line to produce a hybrid corn seed. The hybrid corn seed is harvested and grown to produce a hybrid plant including characteristics of FAR601 or FAR045 or a combination thereof. The invention also contemplates a hybrid corn plant produced by this process and the hybrid corn seed produced by the process. An example of this was produced by crossing FAR601 (e.g., as a male) with FAR045 (e.g., as a female) to yield a hybrid RC701.

An important aspect of the inbred and hybrid corn plants associated with the present invention has to do with the inherent stable color expression present in the plant parts and tissues such as the husk, inflorescences, stem and leaves which differ dramatically from those of standard yellow or white corn. These tissues, especially after flowering, have a deep red to purple color which is also expressed inside the stem tissue. Even the crown roots show a much higher content of anthocyanins as compared to standard corn varieties. The husk leaves surrounding the ear also appear different in phenotype and anthocyanin concentration not found in the husks of standard or regular corn. This is quite visible. This phenomenon is characterized by a red to purple color which intensifies after anthesis. Accordingly, intense pigmentation is present in tissues of the inbreds and hybrid of this invention such as, without limitation, inflorescences, husks, cobs, stems, and grain. Consequently, the stover and grain of the inbreds of this invention and their hybrid have economic value above that normally present due to the intense pigmentation present. The deep coloration manifested by the inbreds of this invention and their hybrid is indicative of high concentrations of pigments, such as anthocyanins, in these tissues.

In the same manner, the grain expresses a deep red to purple color noticeable about two to three weeks after flowering. At physiological maturity, all grains are a complete deep red to purple hue. The cob of these inbreds and their hybrid shows a very deep red to pink and purple phenotypic expression which reaches its highest concentration when the grain is ready for harvest.

The FAR red corn inbreds and hybrids in other respects perform in a manner similar to other standard corn hybrids grown in a field. These other aspects have been found to be acceptable.

All publications cited herein are hereby incorporated by reference.

DETAILED DESCRIPTION

Consumers have become increasingly concerned by the use of artificial food colorants and, consequently, are becoming receptive to the use of food colorants extracted from plants. One plant species offering promise in terms of quantity (or yield) and quality (various colors) of such colorants is maize. Accordingly, the inbreds of this invention combine desirable and productive agronomic traits with high yields of extractible pigments.

1. INBRED LINES AND HYBRID VARIETIES

The ultimate purpose for developing maize inbred lines is to be able to dependably produce hybrids. Commercially viable maize hybrids, like hybrids in many other crop species, manifest heterosis or hybrid vigor for most economically important traits.

Plants resulting from self-pollination (or from other forms of inbreeding) for several generations are termed inbreds (inbred lines). These inbreds are homozygous at almost all loci. When self-pollinated, these inbreds produce a genetically uniform population of true breeding inbred progeny. These inbred progeny possess genotypes and phenotypes essentially identical to that of their inbred parent. A cross between two different inbreds produces a genetically uniform population of hybrid $F_1$ plants. These $F_1$ plants are genetically uniform, but are highly heterozygous. Progeny from a cross between two hybrid $F_1$ plants are also highly heterozygous, but are not genetically uniform.

One important result of this phenomenon is that seed supplies of an inbred may be increased by self-pollinating the inbred plants. Equivalently, seed supplies of the inbred may be increased by growing inbred plants such that only pollen from these inbred plants is present during flowering (anthesis), e.g., in spaced or timed isolation. Seed arising from inbred parents successfully grown in isolation is genetically identical to that the inbred parents. Another important result is that hybrids of inbred lines always have the same appearance and uniformity and can be produced by crossing the same set of inbreds whenever desired. This is because inbreds, themselves, are genetically uniform. Thus, a hybrid created by crossing a defined set of inbreds will always be the same. Moreover, once the inbreds giving rise to a superior hybrid are identified, a continual supply of the hybrid seed can be produced by crossing these identified inbred parents.

Types of hybrids include single-cross, three-way, and double-cross. Single-cross hybrids are the $F_1$ progeny of a cross between two inbred lines (inbreds), e.g., A*B, in which A and B are inbreds. Three-way hybrids are the first generation progeny of a cross between a single-cross hybrid typically used as the female and an inbred, e.g., A*B)(C, in which A*B is a single-cross hybrid of inbreds A and B and C is another inbred. Double-cross hybrids are the first generation progeny of a cross between two single-cross hybrids, e.g., A*B)(C*D, in which A*B and C*D are single-cross hybrids of inbreds A and B and C and D, respectively. In the U.S., single-cross hybrids currently occupy the largest proportion of the acreage used in maize production. As will be shown below, maize inbreds are assemblages of true breeding, homozygous, substantially identical (homogeneous) individuals. Single-cross hybrids are both homogeneous and highly heterozygous and are not true breeding. Three-way and double-cross hybrids are less homogeneous, but are nonetheless highly heterozygous and not true breeding as well. Hence, the only way of improving hybrids is improving component inbreds thereof. Improving maize inbreds involves procedures and concepts developed from the discipline of plant breeding.

2. PLANT BREEDING

Developing improved maize hybrids requires the development of improved maize inbreds. Maize breeding programs typically combine the genetic backgrounds from two or more inbred lines or various other broad based germplasm sources into breeding populations from which new inbred lines are developed by self-pollination (or other forms of inbreeding) and selection for desired phenotypes. The newly developed inbreds are crossed to other inbred tester lines and the hybrids from these tester crosses are then evaluated to determine whether these hybrids might have commercial potential. Thus, the invention of a new maize variety requires a number of steps. As a nonlimiting illustration, these steps may include:

A. selecting plants for initial crosses;

B. crossing the selected plants in a mating scheme to generate $F_1$ progeny;

C. self-pollinating the $F_1$ progeny to generate segregating $F_2$ progeny;

D. sequentially self-pollinating and selecting progeny from the $F_2$ plants for several generations to produce a series of newly developed inbreds, which breed true and are highly uniform, yet which differ from each other;

E. crossing the newly developed inbred lines with other unrelated inbred lines (testers) to produce hybrid seed; and F. evaluating the tester hybrids in replicated and unreplicated performance trials to determine their commercial value.

Plants are selected from germplasm pools to improve hybrid traits such as grain and stover yield, resistance or tolerance to diseases, insects, heat and drought, stalk quality, ear retention, and end use qualities, such as quantity and quality of pigmentation. The selected plants from the germplasm pools are then crossed to produce $F_1$ plants and the $F_1$ plants are self-pollinated to generate populations of $F_2$ plants. Self-pollination and selection in $F_2$ plants and subsequent generations are illustrated below in a nonlimiting example of a pedigree method of breeding.

In the nursery, $F_2$ plants are self-pollinated and selected for stalk quality, reaction to diseases and insects, and other traits such as pigmentation quantity and quality, which are visually scored. During the next growing season, seeds from each selected self-pollinated $F_2$ plant are planted in a row and grown as $F_2$-derived, $F_3$ families. Selection and self-pollination is practiced among and within these $F_3$ families. In a subsequent growing season, seeds from each selected $F_3$ plant are planted in a row and grown as $F_3$-derived, $F_4$ families. Selection and self-pollination are again practiced among and within these $F_4$ families. In a subsequent growing season, seeds from each selected $F_4$ plant are planted in a row and grown as $F_4$-derived, $F_5$ families. At this point, selection is practiced predominantly among families, rather than within families, because plants within families tend to be uniform and are approaching homozygosity and homogeneity. Seeds from selected $F_5$ plants are harvested to be further selected for uniformity prior to being increased.

Simultaneous with self-pollination and selection, seeds from each selected $F_2$, $F_3$, $F_4$, and $F_5$ plant are planted in a female row in one or more isolation blocks along with rows planted with seed of a tester (male) inbred. These isolation blocks are often grown at winter locations so the seed harvested therefrom can be grown in performance trials during the next growing season. Prior to anthesis, tassels from the selected $F_2$, $F_3$, $F_4$, and $F_5$ female plants are removed before they shed pollen, so that the only pollen present in the isolation block is from the tester inbred. Seeds arising from the selected $F_2$, $F_3$, $F_4$, and $F_5$ female plants are hybrid seeds having the selected $F_2$, $F_3$, $F_4$, and $F_5$ plants as maternal (seed) parents and the tester inbred as the paternal (pollen) parent.

Hybrid seeds from the isolation blocks, check hybrids, and commercially significant hybrids of the same maturity are grown in replicated performance trials at a series of locations. Each check hybrid is the result of crossing the tester parent and an inbred parent of known maturity and proven agronomic value. During the growing season, the hybrids are visually scored for any of the above-described traits. At maturity, plots in these trials are usually scored for the percentage of plants with broken or tilted stalks and dropped ears. At harvest, grain yield, grain moisture, pigmentation traits, and grain test weight may be determined. The resulting data from these performance trials are analyzed by calculating means and other statistics. These other statistics (e.g., coefficients of variation, repeatability) provide indications of the reliability (precision) of the means obtained from the performance trials. Means from these performance trials are then used to further cull plants in the nursery on the basis of unsatisfactory performance of their hybrids. Performance trials for earlier generations typically evaluate more hybrids and are planted at fewer locations than performance trials for later generations. At some point, seed supplies of elite inbred candidates from the nursery are increased and are used to produce larger amounts of experimental hybrids. These experimental hybrids are evaluated in replicated performance trials at maximum possible numbers of locations and may be grown alongside commercial hybrids from other seed companies in farmer fields in unreplicated trials as well. If the experimental hybrids perform well with respect to the commercial hybrids in these replicated and unreplicated trials, they are commercialized.

While the above-described pedigree method is widely used to develop maize inbreds, variations are widely used as well. Moreover, other breeding method protocols such as those for bulks, backcrossing, recurrent selection, and mass selection may be practiced in addition to, or in lieu of, the pedigree method described above. Theories and exemplary protocols for the pedigree method, bulk method, recurrent selection, and mass selection are known to the art, but are disclosed in, e.g., A. R. Hallauer and J. B. Miranda Fo, Quantitative Genetics in Maize Breeding, Iowa State University Press, Ames, Iowa (1981); G. Namkoong, Introduction to Quantitative Genetics in Forestry, U.S. Dept. Agric. Forest Service Tech. Bull. No. 1588 (1979); F. N. Briggs and P. F. Knowles, Introduction to Plant Breeding, Reinhold Publishing Company, New York (1967), R. W. Allard, Principles of Plant Breeding, Wiley and Sons, New York (1960), N. W. Simmonds, Principles of Crop Improvement, Longman Group, Ltd., London (1979); and J. M. Poehlman, Breeding Field Crops, 2d Ed., AVI Publishing Co., Inc. Westport, Conn. (1979).

As discussed above, hybrids of promising advanced breeding lines are thoroughly tested and compared to appropriate check hybrids in environments representative of the commercial target area(s), usually for 2-3 years. The best hybrids identified by these performance trials are candidates for commercial exploitation. Seed of each of the newly developed inbred parents of these hybrids is further purified and increased in steps leading to commercial production. These prerequisite activities to marketing newly developed hybrids usually take from eight to 12 years from the time the first breeding cross is made. Therefore, development of new cultivars is a time-consuming process requiring precise planning and efficient allocation and utilization of limiting resources.

Identification of genetically superior individuals is one of the most challenging issues confronting the plant breeder. For many economically important traits, the true genotypic expression of the trait is masked by effects of other (confounding) plant traits and environmental factors. One method of identifying a superior hybrid is to observe its performance relative to other experimental hybrids and to a series of widely grown standard cultivars. However, because a single observation is usually inconclusive, replicated observations over a series of environments are necessary to provide an estimate of the genetic worth of a hybrid.

Maize is an important and valuable field crop. Hence, a continuing goal of plant breeders is to develop high-yielding maize hybrids possessing commercially acceptable quantities of desirable pigments, which are otherwise agronomically desirable and which are produced by stable inbred lines. To accomplish this goal, the maize breeder must continually develop superior inbred parent lines. Developing superior inbred parent lines requires identification and selection of genetically unique, superior individuals from within segregating populations.

Each segregating population is the result of a combination of a multitude of genetic crossover events, independent assortment of specific combinations of alleles at many gene loci, and inheritance of large groups of genes together due to the effects of linkage. Thus, the probability of selecting any single individual with a specific superior genotype from a breeding cross is infinitesimally small due to the large number of segregating genes and the virtually unlimited recombinations of these genes. Nonetheless, the genetic variation present among the segregating progeny of a breeding cross enables the identification of rare and valuable new genotypes. These rare and valuable new genotypes are neither predictable nor incremental in value, but are rather the result of expressed genetic variation. Thus, even if the genotypes of the parents of the breeding cross can be completely characterized and a desired genotype known, only a few, if any, individuals with the desired genotype may be found within a large, segregating $F_2$ population. Typically, however, neither the genotypes of the parents used in the breeding cross nor the desired progeny genotype to be selected are known to any extent.

In addition to the preceding problem, it is not known with any degree of certainty how the new genotype would interact with the environment. This uncertainty is measured statistically by genotype-by-environment interactions and is an important, yet unpredictable, factor in plant breeding. A breeder of ordinary skill in the art can neither predict nor characterize a priori a new desirable genotype, how the genotype will interact with various climatic factors, or the resulting phenotypes of the developing lines, except perhaps in a very broad and gross fashion. A breeder of ordinary skill in the art would also be unable to re-create the same line twice from the same original parents, because the breeder is unable to direct how the parental genomes will recombine in the progeny or how the resulting progeny will interact with environmental conditions when undergoing selection. This unpredictability results in the expenditure of large amounts of limited research resources to develop each superior new maize inbred line.

A reliable method of controlling male fertility (pollen viability) in plants provides means for efficient and economical subsequent hybrid production. This is also the case when plant breeders are developing maize hybrids in breeding programs. All breeding programs rely on some sort of system or method of pollen control and there are several methods of pollen control available to breeders. These pollen control methods include barriers such as bags for covering silks and collecting pollen from individual plants, manual or mechanical emasculation (detasseling), cytoplasmic male-sterility (CMS), genetic male-sterility, and gametocides.

Hybrid maize seed is usually produced commercially by using a male-sterility system, manual or mechanical detasseling, or a combination of both. In typical commercial hybrid seed production, alternate strips of two maize inbreds are planted in a field. The tassels are removed from the inbred designated to be the seed or female parent. Alternatively, the female is male-sterile and is not detasseled. If there is sufficient isolation from sources of foreign maize pollen, the ears of the female inbred will be fertilized only with pollen from the other (male) inbred. The resulting seed, harvested from the female parents in a successful hybrid production effort, is hybrid $F_1$ seed, which will germinate and grow into hybrid $F_1$ plants.

Manual or mechanical detasseling can be avoided by using inbreds with cytoplasmic male-sterility (CMS). CMS requires both a homozygous nuclear locus and the presence of a cytoplasmic factor for sterility. Otherwise, the plant will produce viable pollen. The CMS system requires A-lines (females), B-lines (maintainers), and R-lines (males). Male-sterile A-lines are homozygous for a nuclear allele for pollen sterility and possess the cytoplasmic factor for pollen sterility as well. B-lines produce viable pollen because they are homozygous for the sterile nuclear allele, but possess a fertile cytoplasmic factor. With the exception for the allele for pollen fertility, B-lines usually have a nuclear genome essentially identical to their complimentary A-line. R-lines are homozygous for a nuclear allele for fertility and possess a fertile cytoplasmic factor. Thus, R-lines produce viable pollen. Seed of male-sterile A-lines is increased by being pollinated by complimentary B-lines. The resulting seed grows into male-sterile A-line plants because the fertile cytoplasmic factor from the B-lines is not transmitted by B-line pollen. Hybrid seed is produced by pollinating A-line plants with pollen from R-line plants. The resulting hybrid seed is heterozygous at the nuclear locus and possesses the sterile cytoplasmic factor. Thus, the hybrid seed will grow into plants which produce viable pollen.

In addition to CMS, there are several methods conferring genetic male-sterility. One method involves multiple loci (including a marker gene in one case) which confer male-sterility, as disclosed in U.S. Pat. Nos. 4,654,465 and 4,727,219 to Brar et al. Another method disclosed by U.S. Pat. Nos. 3,861, 709 and 3,710,511 to Patterson uses chromosomal reciprocal translocations, deficiencies, and duplications. In addition to these methods, U.S. Pat. No. 5,432,068 to Albertsen et al., describes a system of induced nuclear male-sterility which includes: identifying a gene critical to male fertility; "silencing" this critical gene; replacing the native promoter from the critical gene with an inducible promoter; and inserting the genetically engineered gene back into the plant. The resulting plant is male-sterile while the inducible promoter is not operative because the male fertility gene is not transcribed. Fertility is restored by inducing the promoter with a non-phytotoxic chemical which induces expression of the critical gene, thereby causing the gene conferring male fertility to be transcribed. U.S. Pat. Nos. 5,689,049 and 5,689,051 to Cigan et al. disclose a transgenic maize plant rendered male-sterile by being transformed with a genetic construct including regulatory elements and DNA sequences capable of acting in a fashion to inhibit pollen formation or function.

Yet another male-sterility system delivers a gene encoding a cytotoxic substance into the plant. The cytotoxic substance is associated with a male tissue-specific promoter or an antisense system. In each instance, a gene critical to fertility is identified and an antisense transcription to that gene is inserted in the plant (see e.g., Fabinjanski, et al., EPO 89/3010153.8 Publication No. 329,308 and PCT Application No. PCT/CA90/00037, published as WO 90/08828.

Another system potentially useful to confer male-sterility uses gametocides. Gametocides are topically applied chemicals affecting the growth and development of cells critical to male fertility. Application of gametocides affects fertility in the plants only for the growing season in which the gametocide is applied. See, e.g., U.S. Pat. No. 4,936,904 to Carlson (N-alkyl-2-aryl-4-oxonicotinates, N-alkyl-5-aryl-4-oxonicotinates, N-alkyl-6-aryl-4-oxonicotinates, N-alkyl-2,6-diaryl-4-oxonicotinates). Inbred genotypes differ in the extent to which they are rendered male-sterile by gametocides and in the growth stages at which the gametocides must be applied.

During hybrid seed production, incomplete detasseling or incomplete inactivation of pollen from the female parent will cause some of the female parent plants to be self-pollinated. These selfed female plants will produce seed of the female inbred, rather than the desired hybrid seed. The selfed seed of the female plants will then be harvested and packaged along with the hybrid seed. Alternatively, seed from the male inbred line may also be present among hybrid seed if the male plants are not eliminated after pollination. In either case, once the mixture of hybrid and "selfed" seed is planted it is possible to identify and select the female or male inbreds growing among hybrid plants. Typically these "selfs" are easily identified and selected because of their decreased vigor for vegetative and/or reproductive characteristics (e.g., shorter plant height, small ear size, ear and kernel shape, or cob color). Identification of these selfs can also be accomplished through molecular marker analyses. See, e.g., Smith et al., "The Identification of Female Selfs in Hybrid Maize: A Comparison Using Electrophoresis and Morphology", Seed Science and Technology 14:1-8 (1995). Through these technologies, the homozygosity of the self-pollinated line can be verified by analyzing allelic composition at various loci along the genome. These methods allow for rapid identification of the invention disclosed herein. See also, Sarca et al., "Identification of Atypical Plants in Hybrid Maize Seed by Postcontrol and Electrophoresis," Probleme de Genetica Teoritica si Aplicata Vol. 20(1): 29-42. As is apparent to one skilled in the art, the foregoing are only some of the ways by which an inbred can be obtained and seed supplies of inbreds and hybrids increased.

3. GRAIN AND STOVER PRODUCTION

This invention is contemplated to include producing stover and grain when hybrids with FAR601 or FAR045 as a parent are grown. Typically seed of these hybrids is planted in soil with adequate moisture to support germination, emergence, and subsequent growth and development. Alternatively, soil moisture is added by irrigation. Normal cultural practices to achieve proper soil fertility and manage weeds, insects, and diseases may be undertaken during the growing season as necessary. These cultural practices are known to persons of skill in the art and vary widely according to particular geographic regions, grower preferences, and economic considerations. The corn plants may be chopped for silage, typically when the developing grain is at the half-milk stage. The grain is harvested when physiologically mature, usually with combines, then dried to a moisture content sufficiently low for storage. The grain may then be used for feed, food, and industrial purposes, examples of which are disclosed herein.

4. DERIVATION

This invention is considered to include processes of developing derived (introgressed) maize inbred lines and plants, seeds, and parts resulting thereof. Processes of developing derived inbred lines include those processes, wherein single genes or alleles or some small plurality of genes or alleles are introgressed into FAR601 or FAR045, resulting in a derived inbred which expresses the introgressed gene(s) or allele(s) (i.e. trait(s)), but otherwise retains the phenotype and genotype of FAR601 or FAR045 described herein. Examples of introgressed genes or alleles include insect or disease resistance, genes from other maize plants, or alleles or genes originating from other species. Non-limiting examples of these genes or alleles are disclosed in Coe et al., "The Genetics of Corn," IN Corn and Corn Improvement, G. F. Sprague and J. W. Dudley, Editors, American Society of Agronomy, Madison, Wis. (1988). Other nonlimiting examples of genes or alleles which might be introgressed into the present invention are disclosed hereinbelow. Methods of introgression may include such protocols as backcrossing, tissue culture to induce somoclonal variation, impaling plant cells with needle-like bodies, use of indeterminate gametophyte, anther culture, and transformation.

Backcrossing protocols are disclosed, e.g. in above-referenced F. N. Briggs and P. F. Knowles, Introduction to Plant Breeding, Reinhold Publishing Company, New York (1967), R. W. Allard, Principles of Plant Breeding, Wiley and Sons, New York (1960), N. W. Simmonds, Principles of Crop Improvement, Longman Group, Ltd., London (1979); and J. M. Poehlman, Breeding Field Crops, 2d Ed., AVI Publishing Co., Inc. Westport, Conn. (1979). Use of indeterminate gametophyte-facilitated (ig1) introgression of cytologically inherited traits is disclosed by, e.g., J. L. Kermicle, "Androgenesis Conditioned by a Mutation in Maize," Science 166: 1422-1424 (1969).

Isolated microspore, anther culture and regeneration of fertile maize plants are disclosed in U.S. Pat. No. 5,445,961 to Genovesi et al. Introgression protocols using anther culture are disclosed, e.g., by Barnabas et al., "Ultrastructural Studies on Pollen Embryogenesis in Maize (*Zea mays* L)", Plant Cell Rep. 6: 212-215 (1987); Dieu et al., "Further Studies of Androgenetic Embryo Production and Plant Regeneration From In Vitro Cultured Anthers in Maze (*Zea mays* L.)," Maydica 31: 245-259 (1986); Pace et al., "Anther Culture of Maize and the Visualization of Embryogenic Microspores by Fluorescent Microscopy," Theor. Appl. Genet. 73: 863-869 (1987); Petolino et al., "Anther Culture of Elite Genotypes of Maize," Crop Sci. 26: 1072-1074 (1986); and Tsay et al., "Factors Affecting Haploid Plant Regeneration from Maize Anther Culture," J. Plant Physiol. 126: 33-40 (1986).

Exemplary transformation protocols are disclosed, e.g., by U.S. Pat. No. 5,302,523 to Coffee et al. (transformed maize via needle-like bodies); U.S. Pat. No. 5,384,253 to Krzyzek et al. (electroporation); U.S. Pat. No. 5,371,003 to Murray et al. (transformation via tissues within horizontal electrophoresis gel in the presence of non-pulsed electric current); U.S. Pat. No. 5,591,616 to Hiei et al. (*Agrobacterium*-mediated transformation); U.S. Pat. No. 5,569,597 to Grimsley et al. (*Agrobacterium*-mediated maize transformation); U.S. Pat. No. 5,877,023 to Sautter et al. (microprojectile-facilitated transformation); U.S. Pat. No. 5,736,369 to Bowen et al. (microprojectile-facilitated transformation); U.S. Pat. Nos. 5,886,244 and 5,990,387 to Tomes et al. (microprojectile-facilitated transformation); U.S. Pat. No. 5,776,900 to Shillito et al. (regeneration of maize protoplasts transformed with electroporation and polyethylene glycol (PEG)); U.S. Pat. Nos. 5,767,367 and 5,792,936 to Dudits et al. (regeneration of PEG-transformed protoplasts of auxin-autotrophic maize genotype); U.S. Pat. Nos. 5,780,708 and 5,990,390 to Lundquist et al. (fertile, microprojectile-facilitated transgenic maize plants expressing dalapon resistance); U.S. Pat. Nos. 5,780,709 and 5,919,675 to Adams et al. (microprojectile- and electroporation-facilitated maize transformants); U.S. Pat. No. 5,932,782 to Bidney (microprojectile-delivered *Agrobacterium*); U.S. Pat. No. 5,981,840 to Zhao et al. (*Agrobacterium*-transformed maize); and U.S. Pat. No. 5,994,624 to Trolinder et al. (maize transformation via recombinant *Agrobacterium* DNA injected into plant tissues via needleless injection device). An exemplary transformation protocol is more fully disclosed hereinbelow.

5. FURTHER USES

This invention is also contemplated to include processes or methods of producing a maize plant by crossing a first parent maize plant with a second parent maize plant in which the first or second parent maize plant is the inbred maize line FAR601 or FAR045. Moreover, both the first and second parent maize plants may include the inbred maize lines FAR601 and/or FAR045.

This invention is also directed to processes or methods of producing FAR601 or FAR045-derived maize plant or an inbred maize plant with FAR601 or FAR045 as a parent in at least one of the initial breeding crosses accomplished by crossing inbred maize line FAR601 or FAR045 with a second maize plant and growing the progeny seed. The method may further include repeating crossing and growing the FAR601-derived or FAR045-derived plant until the substantial genotype of FAR601 or FAR045 is recovered. Thus, any methods using the inbred maize line FAR601 or FAR045 are contemplated to be within the scope of this invention, e.g., selfing, backcrossing, hybrid production, crosses to other hybrids, inbreds, populations, and the like. All plants produced using inbred maize line FAR601 or FAR045 as a parent are contemplated to be within the scope of this invention, including plants derived from inbred maize line FAR601 or FAR045. It should be further understood that inbred maize line FAR601 or FAR045 can, through routine manipulation known to skilled persons in the art, be produced in a male-sterile form and that such embodiments are contemplated to be within the scope of the present invention as well.

As used herein, the term "plant" includes whole or entire plants and parts thereof. Such exemplary plant parts may include plant cells, plant protoplasts, plant cell tissue cultures, plant calli, plant clumps, plant cell suspension cultures, and plant protoplasts. Also included within the definition of the term "plant" are plant cells present in plants or parts of plants, e.g., zygotes, embryos, embryonic organs, pollen, ovules, flowers, seeds, ears, cobs, leaves, husks, stalks, roots, root tips, anthers, and silks.

Tissue Culture of Maize

Regeneration of maize plants by tissue culture methods is now an exercise requiring only routine experimentation to a person skilled in the art. For example, Duncan et al. (Planta 165:322-332 (1985)) reported 97% of the plant genotypes cultured produced calli capable of plant regeneration. Plants were regenerated from 91% of the calli from another set of inbreds and hybrids in a subsequent experiment.

Songstad et al., (Plant Cell Reports, 7:262-265 (1988)) reported several media additions enhancing regenerability of callus of two inbred lines. Other published reports also indicated "nontraditional" tissues capable of producing somatic embryogenesis and plant regeneration. For example, Rao, et al. (Maize Genetics Cooperation Newsletter, 60:64-65 (1986)) reported somatic embryogenesis from glume callus cultures. Conger, et al. (Plant Cell Reports, 6:345-347 (1987)) reported somatic embryogenesis from tissue cultures of maize leaf segments. Thus, it is clear that the state of the art is such that these tissue culture methods of obtaining regenerated plants are routinely used with very high rates of success.

Maize tissue culture is described generally in European Patent Application, Publication 160,390 and with respect to inbred line B73 in U.S. Pat. No. 5,134,074 to Gordon et al. Maize tissue culture procedures are also described by U.S. Pat. No. 4,581,847 to Hibberd et al., by Kamo et al. "Establishment and Characterization of Long-Term Embryonic Maize Callus and Cell Suspension Cultures," Plant Science 45: 111-117, by Vasil et al., "Plant Regeneration from Friable Embryonic Callus and Cell Suspension Culture of Zea mays L.," J. Plant Physiol. 124:399-408 (1986), by Green et al., "Plant Regeneration in Tissue Culture of Maize," Maize for Biological Research (Plant Molecular Biology Association, Charlottesville, Va. 1982, at 367-372) and by Duncan, et al., "The Production of Callus Capable of Plant Regeneration from Immature Embryos of Numerous Zea Mays Genotypes," 165 Planta 322-332 (1985). Thus, another aspect of this invention is to provide cells, which undergo growth and differentiation and subsequently produce maize plants with the physiological and morphological characteristics of inbred maize line FAR601 or FAR045.

Somaclonal variation within inbred lines which have undergone tissue culture and regeneration have been reported by Edallo et al. ("Chromosome Variation and Frequency of Spontaneous Mutants Associated With In Vitro Culture and Plant Regeneration in Maize," Maydica 26: 39-56 (1981)); McCoy et al. ("Chromosome Stability in Maize (Zea Mays L.) Tissue Culture and Sectoring in Some Regenerated Plants," Can. J. Genet. Cytol. 24: 559-565 (1982)), Earle et al. ("Somaclonal Variation in Progeny of Plants From Corn Tissue Culture," pp 139-152, IN R. R. Henke et al. (ED.) Tissue Culture in Forestry and Agriculture, Plenum Press, N.Y. (1985)); and Lee et al. ("Agronomic Evaluation of Inbred Lines Derived From Tissue Cultures of Maize," Theor. Appl. Genet. 75: 841-849 (1988)). Hence, genetic variation and derived lines may be developed from this invention by tissue culture protocols.

The utility of inbred maize line FAR601 or FAR045 also extends to crosses with other species. Suitable species will be of the family Gramineae, and especially genera such as Zea, Tripsacum, Coix, Schlerachne, Polytoca, Chionachne, and Trilobachne, of the tribe Maydeae. Potentially suitable for crosses with inbred maize line FAR601 or FAR045 may be the various varieties of grain sorghum, Sorghum bicolor (L.) Moench. or other species within the genus Sorghum.

6. TRANSFORMATION

Molecular biological techniques now allow genes encoding specific protein products to be isolated and characterized. It has long been viewed as advantageous to modify maize plant genomes to contain and express foreign genes, or additional, or modified versions of native or endogenous genes (perhaps driven by different promoters) to alter traits of a plant in a specific, directed manner. Such foreign, additional and/or modified genes are referred to herein collectively as "transgenes" and several methods for producing transgenic plants have been developed. Accordingly, embodiments of this invention also include derived inbreds which are transformed versions of inbred maize line FAR601 or FAR045.

Plant transformation requires construction of an expression vector to function in plant cells. Such an expression vector includes DNA. The vector DNA, in turn, includes a gene under control of, or operatively linked to, a regulatory element such as a promoter. The expression vector may contain one or more such operably linked gene/regulatory element combinations; may be in the form of a plasmid; and can also be used alone, or in combination with other plasmids, to transform maize plants using transformation methods such as those described below.

7. MARKER GENES

Expression vectors usually include at least one genetic marker operably linked to a regulatory element such as a promoter. The regulatory element allows transformed cells containing the marker to be recovered either by negative or positive selection. Negative selection includes inhibiting the growth of cells not containing the selectable marker gene. By contrast, positive selection includes screening for the product encoded by the genetic marker. Many commonly used selectable markers for identifying transformed plant cells are known in the art. Such exemplary selectable markers include genes encoding enzymes which metabolically detoxify a selective chemical agent such as an antibiotic or an herbicide. Other selectable markers include genes encoding an altered target which is insensitive to an inhibitor. A few positive selection methods are also known.

One commonly used selectable marker is the neomycin phosphotransferase II gene (nptII), isolated from transposon Tn5 and conferring resistance to kanamycin. Fraley et al., Proc. Natl. Acad. Sci. U.S.A., 80: 4803 (1983); U.S. Pat. No. 5,858,742 to Fraley et al. Another commonly used selectable marker gene is the hygromycin phosphotransferase gene conferring resistance to the antibiotic hygromycin. Vanden Elzen et al., Plant Mol. Biol., 5: 299 (1985).

Other selectable marker genes of bacterial origin conferring resistance to antibiotics include gentamycin acetyl transferase, streptomycin phosphotransferase, aminoglycoside-3'-adenyl transferase, and bleomycin resistance determinant. Hayford et al., Plant Physiol. 86: 1216 (1988); Jones et al., Mol. Gen. Genet., 210: 86 (1987); Svab et al., Plant Mol. Biol. 14: 197 (1990); and Hille et al., Plant Mol. Biol. 7: 171 (1986).

Still other selectable markers confer resistance to herbicides such as glyphosate, glufosinate, or bromoxynil. Comai et al., Nature 317: 741-744 (1985); Gordon-Kamm et al., Plant Cell 2: 603-618 (1990); and Stalker et al., Science 242: 419-423 (1988).

Yet other selectable marker genes include mouse dihydrofolate reductase, plant 5-enolpyruvylshikimate-3-phosphate synthase, and plant acetolactate synthase. Eichholtz et al., Somatic Cell Mol. Genet. 13: 67 (1987); Shah et al., Science 233: 478 (1986); and Charest et al., Plant Cell Rep. 8: 643 (1990).

Another class of marker genes useful in plant transformation requires screening putatively transformed plant cells, rather than direct genetic selection of transformed cells. These genes are used to quantify or visualize spatial patterns of gene expression in specific tissues. Marker genes of this nature are frequently termed "reporter genes" because they can be fused to a gene or gene regulatory sequence to investigate gene expression. Commonly used genes for screening presumptively transformed cells include β-glucuronidase (GUS), β-galactosidase, luciferase and chloramphenicol acetyltransferase. Jefferson, Plant Mol. Biol. Rep. 5: 387 (1987); Teeri et al., EMBO J. 8: 343 (1989); Koncz et al., Proc. Natl. Acad. Sci. U.S.A. 84: 131 (1987); and De Block et al., EMBO J. 3: 1681 (1984). Until recently, methods for visualizing GUS activity required destruction of the living plant material. However, in vivo methods for visualizing GUS activity not requiring destruction of plant tissue are now available. Molecular Probes Publication 2908, Imagene Green™, p. 1-4 (1993); and Naleway et al., J. Cell Biol. 115: 151a (1991).

Another method of identifying rare transformation events includes using a gene encoding a dominant constitutive regulator of the *Zea mays* anthocyanin pigmentation pathway. Ludwig et al., Science 247: 449 (1990). A gene encoding for Green Fluorescent Protein (GFP) has been utilized as a marker for gene expression in prokaryotic and eukaryotic cells. Chalfie et al., Science 263: 802 (1994).

8. PROMOTERS

Genes in expression vectors must be driven by a nucleotide sequence comprising a regulatory element such as a promoter. Several types of promoters are now known, as are other regulatory elements which can be used singly or in combination with promoters. As used herein "promoter" includes a region of DNA upstream from the initial site of transcription. The promoter is involved in recognizing and binding RNA polymerase and other proteins during transcription initiation. A "plant promoter" is a promoter capable of initiating transcription in plant cells.

Examples of promoters under developmental control include promoters which preferentially initiate transcription in certain tissues, such as leaves, roots, seeds, fibers, xylem vessels, tracheids, or sclerenchyma. Such promoters are referred to as "tissue-preferred." Promoters initiating transcription only in certain tissues are referred to as "tissue-specific." A "cell type-specific" promoter primarily drives expression only in certain cell types present in specific organs, e.g., vascular cells in roots or leaves. An "inducible" promoter is a promoter under environmental control. Examples of environmental conditions affecting transcription by inducible promoters include anaerobic conditions or the presence of light. Tissue-specific, tissue-preferred, cell type-specific, and inducible promoters constitute the class of "non-constitutive" promoters. In contrast to non-constitutive promoters, "constitutive" promoters function under most environmental conditions.

A. Inducible Promoters

An inducible promoter may be operably linked to a gene to be expressed in maize. Optionally, the inducible promoter is operably linked to a nucleotide sequence encoding a signal sequence. The signal sequence, in turn, is operably linked to a gene to be expressed in maize. With an inducible promoter, the rate of transcription increases in response to an inducing agent.

Any inducible promoter can be used in conjunction with this invention. See, e.g., Ward et al. Plant Mol. Biol. 22: 361-366 (1993). Exemplary inducible promoters include, but are not limited to, the promoter the ACEI system responding to copper (Mett et al. PNAS 90: 4567-4571 (1993)); the maize In2 gene responding to benzenesulfonamide herbicide safeners (Hershey et al., Mol. Gen. Genetics 227: 229-237 (1991) and Gatz et al., Mol. Gen. Genetics 243: 32-38 (1994)); or the Tet repressor from Tn10 (Gatz et al., Mol. Gen. Genet. 227: 229-237 (1991). One suitable inducible promoter responds to an inducing agent to which plants do not normally respond. One such exemplary inducible promoter is induced by a glucocorticosteroid hormone. Schena et al., Proc. Natl. Acad. Sci. U.S.A. 88: 0421 (1991).

B. Constitutive Promoters

A constitutive promoter is operably linked to a gene to be expressed in maize. Alternatively, the constitutive promoter is operably linked to a nucleotide sequence encoding a signal sequence which, in turn, is operably linked to a gene to be expressed in maize. Many different constitutive promoters can be utilized with respect to the inbred of this invention. Exemplary constitutive promoters include, but are not limited to, promoters from plant viruses such as the 35S promoter from CaMV (Odell et al., Nature 313: 810-812 (1985); U.S. Pat. No. 5,858,742 to Fraley et al.); promoters from such plant genes as rice actin (McElroy et al., Plant Cell 2: 163-171 (1990)); ubiquitin (Christensen et al., Plant Mol. Biol. 12: 619-632 (1989) and Christensen et al., Plant Mol. Biol. 18: 675-689 (1992)); pEMU (Last et al., Theor. Appl. Genet. 81: 581-588 (1991)); MAS (Velten et al., EMBO J. 3: 2723-2730 (1984)) and maize H3 histone (Lepetit et al., Mol. Gen. Genet. 231: 276-285 (1992) and Atanassova et al., Plant Journal 2(3): 291-300 (1992)); and the ALS promoter, a XbaI/NcoI fragment 5' to the *Brassica napus* ALS3 structural gene or a nucleotide sequence with substantial sequence similarity (PCT Application No. WO96/30530).

C. Tissue-Specific or Tissue-Preferred Promoters

A tissue-specific promoter is operably linked to a gene to be expressed in maize. Optionally, the tissue-specific promoter is operably linked to a nucleotide sequence encoding a signal sequence which is operably linked to a gene to be expressed in maize. Plants transformed with a gene operably linked to a tissue-specific promoter produce the protein product of the transgene exclusively, or preferentially, in a specific tissue.

Any tissue-specific or tissue-preferred promoter can be introgressed into the inbred of this invention. Exemplary tissue-specific or tissue-preferred promoters include, but are not limited to, a root-preferred promoter, such as that from the phaseolin gene (Murai et al., Science 23: 476-482 (1983) and Sengupta-Gopalan et al., Proc. Natl. Acad. Sci. USA 82: 3320-3324 (1985)); a leaf-specific and light-induced promoter such as that from cab or rubisco (Simpson et al., EMBO J. 4(11): 2723-2729 (1985) and Timko et al., Nature 318: 579-582 (1985)); an anther-specific promoter such as that from LAT52 (Twell et al., Mol. Gen. Genet. 217: 240-245 (1989)); a pollen-specific promoter such as that from Zm13 (Guerrero et al., Mol. Gen. Genet. 224: 161-168 (1993)); and a microspore-preferred promoter such as that from apg (Twell et al., Sex. Plant Reprod. 6: 217-224 (1993)).

9. SIGNAL SEQUENCES FOR TARGETING PROTEINS TO SUBCELLULAR COMPARTMENTS

Proteins produced by transgenes may be transported to a subcellular location such as a chloroplast, vacuole, peroxisome, glyoxysome, cell wall or mitochondrion, or for secretion into the apoplast, by operably linking the nucleotide sequence encoding a signal sequence to the 5' and/or 3' region of a gene encoding the protein of interest. Targeting sequences at the 5' and/or 3' end of the structural gene may determine where the encoded protein is ultimately compartmentalized during protein synthesis and processing. The presence of a signal sequence directs a polypeptide to an intracellular organelle, a subcellular compartment, or to the apoplast for secretion. Many signal sequences are known in the art. See, e.g., Becker et al., Plant Mol. Biol. 20: 49 (1992); P. S. Close, Master's Thesis, Iowa State University (1993); Knox, et al., "Structure and Organization of Two Divergent Alpha-Amylase Genes From Barley," Plant Mol. Biol. 9: 3-17 (1987); Lerner et al., Plant Physiol. 91: 124-129 (1989); Fontes et al., Plant Cell 3: 483-496 (1991); Matsuoka et al., Proc. Natl. Acad. Sci. 88: 834 (1991); Gould et al., J. Cell Biol 108: 1657 (1989); Creissen et al., Plant J. 2: 129 (1991); Kalderon et al., "A short amino acid sequence able to specify nuclear location," Cell 39: 499-509 (1984); and Stiefel et al., "Expression of a maize cell wall hydroxyproline-rich glycoprotein gene in early leaf and root vascular differentiation," Plant Cell 2: 785-793 (1990).

10. FOREIGN PROTEIN GENES AND AGRONOMIC GENES

A foreign protein can be produced by transgenic plants of this invention and may further be produced in commercial quantities. Thus, techniques for selection and propagation of transformed plants provide a plurality of transgenic plants, which may be harvested in a conventional manner. A foreign protein expressed in the transgenic plants can then be extracted either from a specific tissue or from total harvested plant biomass. Protein extraction from plant biomass can be accomplished by methods which are discussed, e.g., by Heney et al., Anal. Biochem. 114: 92-96 (1981).

Thus, this invention is contemplated to include transformed, therefore derived, embodiments of inbred maize line FAR601 or FAR045. In another embodiment, the biomass of interest is the vegetative tissue of inbred maize line FAR601 or FAR045. In yet another embodiment, the biomass of interest is grain (seed). For transgenic plants, a genetic map can be generated, primarily via conventional Restriction Fragment Length Polymorphisms (RFLP), Polymerase Chain Reaction (PCR) analysis, Random Amplified Polymorphic DNA (RAPD), Amplified Fragment Length Polymorphisms (AFLP), Single Nucleotide Polymorphisms (SNP), and Simple Sequence Repeats (SSR), which identify the approximate chromosomal location of the integrated DNA. For exemplary methodologies in this regard, see Glick et al., Methods in Plant Molecular Biology and Biotechnology, 269-284 (CRC Press, Boca Raton, 1993). Map information concerning chromosomal location is useful for proprietary protection of a given transgenic plant. Hence, if unauthorized propagation occurs and crosses of the present inbred are made to other germplasm, the map of the integration region can be compared to similar maps of suspect plants, thereby determining whether the suspect plants have a common parentage with the subject plant. Map comparisons require hybridization and subsequent RFLP, PCR, SSR, RAPD, AFLP, SNP and/or sequencing, all of which are known techniques.

Agronomic genes can be expressed in the transformed plants of this invention. More particularly, plants of this invention can be transformed, or otherwise derived, to express various phenotypes of agronomic interest. Exemplary genes implicated in this regard include, but are not limited to, those categorized below.

11. GENES CONFERRING RESISTANCE TO PESTS OR DISEASES

A. Plant Disease Resistance Genes

Plant defenses are often activated by specific interaction between the product of a disease resistance gene (R) in the plant and the product of a corresponding avirulence (Avr) gene in the pathogen. A plant variety can be transformed with a cloned disease resistance gene to develop plants resistant to pathogen strains. See, e.g., Jones et al., Science 266: 789 (1994) (cloning of tomato Cf-9 gene resistant to *Cladosporium fulvum*); Martin et al., Science 262: 1432 (1993) (tomato Pto gene resistant to *Pseudomonas syringae* pv. tomato encoding a protein kinase); Mindrinos et al., Cell 78:1089 (1994) (*Arabidopsis* RSP2 gene resistant to *Pseudomonas syringae*); U.S. Pat. No. 5,789,214 to Ryals et al. (chemically regulatable DNA sequences regulating transcription of pathogenesis-related proteins); and PCT Patent Application Publication WO95/16776 to Putman et al. (derivatives of tachyplesin peptide with antimicrobial activity against plant pathogens).

B. *Bacillus thuringiensis* (B.t.) Proteins

*Bacillus thuringiensis* (B.t.) proteins, derivatives thereof, or a synthetic polypeptides modeled thereon. See, e.g., Geiser et al., Gene 48: 109 (1986) (cloning and nucleotide sequencing of B.t. δ-endotoxin gene). DNA molecules encoding δ-endotoxin genes are designated as ATCC Accession Nos. 40098, 67136, 31995 and 31998 and can be obtained from American Type Culture Collection, Manassas, Va. 20110.

C. Lectins

Lectins. See, e.g., Van Damme et al., Plant Molec. Biol. 24: 25 (1994) (nucleotide sequences of *Clivia miniata* mannose-binding lectin genes).

D. Vitamin-Binding Proteins

Vitamin-binding proteins such as avidin. See, e.g., PCT Application No. US93/06487 (avidin and avidin homologues as larvicides against insect pests).

E. Enzyme Inhibitors

Enzyme inhibitors such as protease inhibitors or amylase inhibitors. See, e.g., Abe et al., J. Biol. Chem. 262: 16793 (1987) (nucleotide sequence of rice cysteine proteinase inhibitor); Huub et al., Plant Molec. Biol. 21: 985 (1993) (nucleotide sequence of cDNA encoding tobacco proteinase inhibitor I); and Sumitani et al., Biosci. Biotech. Biochem. 57: 1243 (1993) (nucleotide sequence of *Streptomyces nitrosporeus* α-amylase inhibitor).

F. Insect-Specific Hormone or Pheromone

An insect-specific hormone or pheromone such as an ecdysteroid and juvenile hormone, a variant thereof, a mimetic based thereon, or an antagonist or agonist thereof. See, e.g., Hammock et al., Nature 344: 458 (1990), (baculovirus expression of cloned juvenile hormone esterase, an inactivator of juvenile hormone).

G. Insect-Specific Peptides or Neuropeptides

Insect-specific peptides or neuropeptides disrupting pest physiologies. See, e.g., Regan, Biol. Chem. 269: 9 (1994) (expression cloning yields DNA coding for insect diuretic hormone receptor); and Pratt et al., Biochem. Biophys. Res. Comm. 163: 1243 (1989) (allostatin identified in *Diploptera puntata*); U.S. Pat. No. 5,266,317 to Tomalski et al. (genes encoding insect-specific, paralytic neurotoxins).

H. Insect-Specific Venoms

Insect-specific venoms produced in nature by, e.g., snakes, wasps. See, e.g., Pang et al., Gene 116: 165 (1992) (heterologous expression in plants of a gene coding a scorpion insectotoxic peptide).

I. Enzymes

Enzymes responsible for hyperaccumulation of monterpenes, sesquiterpenes, steroids, hydroxamic acids, phenylpropanoid derivatives or other non-protein molecules with insecticidal activity.

Enzymes involved in the modification, including post-translational modification, of biologically active molecules. Such enzymes are contemplated to include natural or synthetic glycolytic enzymes, proteolytic enzymes, lipolytic enzymes, nucleases, cyclases, transaminases, esterases, hydrolases, phosphatases, kinases, phosphorylases, polymerases, elastases, chitinases and glucanases. See, e.g., PCT Application No. WO 93/02197 to Scott et al. (callase gene nucleotide sequence). DNA molecules containing chitinase-encoding sequences can be obtained, e.g., from the ATCC under Accession Nos. 39637 and 67152. See, also Kramer et al., Insect Biochem. Molec. Biol. 23: 691 (1993) (nucleotide sequence of cDNA-encoding tobacco hookworm chitinase);

and Kawalleck et al., Plant Molec. Biol. 21: 673 (1993) (nucleotide sequence of the parsley ubi4-2 polyubiquitin gene).

J. Signal Transduction

Molecules stimulating signal transduction. See, e.g., Botella et al., Plant Molec. Biol. 24: 757 (1994) (nucleotide sequences for mung bean calmodulin cDNA clones); and Griess et al., Plant Physiol. 104: 1467 (1994) (nucleotide sequence of maize calmodulin cDNA clone).

K. Hydrophobic Moment Peptides

Hydrophobic moment peptides. See, e.g., PCT Application No. WO95/16776 (peptide derivatives of Tachyplesin-inhibiting fungal plant pathogens) and PCT Application No. WO95/18855 (synthetic antimicrobial peptides conferring disease resistance).

L. Membrane Permeases, Channel Formers, or Channel Blockers.

See, e.g., Jaynes et al., Plant Sci. 89: 43 (1993) (heterologous expression of cecropin-β lytic peptide analog rendering transgenic tobacco plants resistant to *Pseudomonas solanacearum*).

M. Viral-Invasive Proteins

Viral-invasive proteins or complex toxins derived therefrom. For example, the accumulation of viral coat proteins in transformed plant cells imparting resistance to viral infection and/or disease development effected by the virus from which the coat protein gene is derived, as well as to related viruses. See, e.g., Beachy et al., Ann. Rev. Phytopathol. 28: 451 (1990). Coat protein-mediated resistance has been conferred on transformed plants against alfalfa mosaic virus, cucumber mosaic virus, tobacco streak virus, potato virus X, potato virus Y, tobacco etch virus, tobacco rattle virus and tobacco mosaic virus. Id.

N. Insect-Specific Antibodies or Immunotoxins Derived Therefrom

An antibody targeted to a critical metabolic function in the insect gut inactivating an affected enzyme, thereby killing the insect. Cf. Taylor et al., Abstract #497, SEVENTH INT'L SYMPOSIUM ON MOLECULAR PLANT-MICROBE INTERACTIONS (Edinburgh, Scotland, 1994) (enzymatic inactivation in transgenic tobacco via single-chain antibody fragment production).

O. Virus-Specific Antibodies

Virus-specific antibodies. See, e.g., Tavladoraki et al., Nature 366: 469 (1993), (transgenic plants expressing recombinant antibody genes are protected from virus attack).

P. Developmental-Arrestive Proteins i. Developmental-Arrestive Proteins Produced by Pathogens or Parasites. See, e.g., Lamb et al., Bio/Technology 10: 1436 (1992) (fungal endo α-1,4-D-polygalacturonases facilitating fungal colonization and plant nutrient release by solubilizing plant cell wall homo-α-1,4-D-galacturonase); and Toubart et al., Plant J. 2: 367 (1992) (cloning and characterization of a gene encoding bean endopolygalacturonase-inhibiting protein).

ii. Developmental-Arrestive Proteins Produced by Plants. See, e.g., Logemann et al., Bio/Technology 10: 305 (1992) (increased resistance to fungal disease in transgenic plants expressing barley ribosome-inactivating gene).

Q. Genes Conferring Resistance to Herbicides

Herbicides inhibiting growing points or meristems, such as imidazolinone or a sulfonylurea. Exemplary genes in this category encode mutant ALS and AHAS enzymes, respectively described by Lee et al., EMBO J. 7: 1241 (1988); and Miki et al., Theor. Appl. Genet. 80: 449 (1990).

Glyphosate resistance (imparted by mutant 5-enolpyruvl-3-phosphoshikimate synthase (EPSP) and aroA genes, respectively) and other phosphono compounds such as glufosinate (phosphinothricin acetyl transferase (PAT) and *Streptomyces hygroscopicus* phosphinothricin acetyl transferase (bar) genes), and pyridinoxy or phenoxy proprionic acids and cyclohexones (ACCase inhibitor-encoding genes). See, e.g., U.S. Pat. No. 4,940,835 to Shah et al., (EPSP clone conferring glyphosate resistance). A DNA molecule encoding a mutant aroA gene can be obtained under ATCC Accession No. 39256. The nucleotide sequence of such a mutant gene is disclosed in U.S. Pat. No. 4,769,061 to Comai. European Patent Application No. 0 333 033 to Kumada et al. and U.S. Pat. No. 4,975,374 to Goodman et al. disclose nucleotide sequences of glutamine synthetase genes conferring resistance to herbicides such as L-phosphinothricin. A nucleotide sequence of a phosphinothricin-acetyl-transferase gene is disclosed in European Patent Application 0 242 246 to Leemans et al. De Greef et al., Bio/Technology 7: 61 (1989), describe the production of transgenic plants expressing chimeric bar genes coding for phosphinothricin acetyl transferase activity. Exemplary genes conferring resistance to phenoxy proprionic acids and cyclohexones, such as sethoxydim and haloxyfop, are the Acc1-S1, Acc1-S2 and Acc1-S3 genes described by Marshall et al., Theor. Appl. Genet. 83: 435 (1992).

Photosynthesis-inhibiting herbicides, such as triazines (psbA and gs+genes) and benzonitriles (nitrilase gene). Przibilla et al., Plant Cell 3: 169 (1991) (transformation of *Chlamydomonas* using plasmids encoding mutant psbA genes); U.S. Pat. No. 4,810,648 to Stalker (nucleotide sequences for nitrilase genes, available under ATCC Accession Nos. 53435, 67441 and 67442); Hayes et al., Biochem. J. 285:173 (1992) (cloning and expression of DNA coding for glutathione S-transferase).

R. Genes Conferring, or Contributing to, Value-Added Traits in Maize i. Modified Fatty Acid Metabolism, Fatty acid content can be modified by, for example, transforming a plant with an antisense gene of stearoyl-ACP desaturase to increase stearic acid content. See, e.g., Knultzon et al., Proc. Natl. Acad. Sci. USA 89: 2624 (1992).

ii. Decreased Phytate Content

Phytase-encoding genes enhancing breakdown of phytate by adding free phosphate to the transformed plant. See, e.g., Van Hartingsveldt et al., Gene 127: 87 (1993) (nucleotide sequence of an *Aspergillus niger* phytase gene).

S. Genes Reducing Phytate Content

For example, cloning, then reintroducing DNA associated with the allele responsible for maize mutants characterized by low levels of phytic acid. See, e.g., Raboy et al., Maydica 35: 383 (1990).

T. Modified Carbohydrate Compositions

For example, transforming plants with a gene encoding an enzyme altering starch branching patterns. See, e.g., Shiroza et al., J. Bacteriol. 170: 810 (1988) (nucleotide sequence of *Streptococcus mutans* fructosyltransferase gene); Steinmetz et al., Mol. Gen. Genet. 200: 220 (1985) (nucleotide sequence of *Bacillus subtilis* levansucrase gene); Pen et al., Bio/Technology 10: 292 (1992) (production of transgenic plants expressing *Bacillus licheniformis* α-amylase); Elliot et al., Plant Molec. Biol. 21: 515 (1993) (nucleotide sequences of tomato invertase genes); Søgaard et al., J. Biol. Chem. 268: 22480 (1993) (site-directed mutagenesis of barley α-amylase gene); and Fisher et al., Plant Physiol. 102: 1045 (1993) (maize endosperm starch branching enzyme II).

12. MAIZE TRANSFORMATION METHODS

Plant transformation methods contemplated to transform the inbred of this invention include biological and physical plant transformation protocols. See, e.g., Miki et al., "Procedures for Introducing Foreign DNA into Plants" IN Methods in Plant Molecular Biology and Biotechnology, B. R. Glick and J. E. Thompson, Eds. (CRC Press, Inc., Boca Raton, 1993) pages 67-88; Gruber et al., "Vectors for Plant Transformation" in Methods in Plant Molecular Biology and Biotechnology (expression vectors and in vitro culture methods for plant cell or tissue transformation and regeneration of plants); and B. R. Glick and J. E. Thompson, Eds., CRC Press, Inc., Boca Raton, (1993) pages 89-119 (expression vectors and in vitro culture methods for plant cell or tissue transformation and regeneration of plants).

A. *Agrobacterium*-Mediated Transformation

One method for introducing an expression vector into plants is based on the natural transformation system of *Agrobacterium*. See, e.g., Horsch et al., Science 227: 1229 (1985). *A. tumefaciens* and *A. rhizogenes* are plant pathogenic soil bacteria which infect, and genetically transform, plant cells during infection. The Ti and Ri plasmids of *A. tumefaciens* and *A. rhizogenes*, respectively, carry genes responsible for genetic transformation of the plant. See, e.g., Kado, Crit. Rev. Plant. Sci. 10: 1 (1991). Descriptions of *Agrobacterium* vector systems and methods for *Agrobacterium*-mediated gene transfer (transformation) are provided by Gruber et al., "Vectors for Plant Transformation" IN Methods in Plant Molecular Biology and Biotechnology; Miki et al., "Procedures for Introducing Foreign DNA into Plants" IN Methods in Plant Molecular Biology and Biotechnology, B. R. Glick and J. E. Thompson, Eds. (CRC Press, Inc., Boca Raton, 1993) pages 67-88; Moloney et al., Plant Cell Reports 8: 238 (1989); and U.S. Pat. No. 5,591,616 to Hiei et al.; and U.S. Pat. No. 6,822,144, issued 23 Nov. 2004 to Zhao et al.

B. Direct Gene Transfer

Despite the fact that the host range for *Agrobacterium*-mediated transformation is broad and with some exceptions in rice and maize, most major cereal crop species and gymnosperms have generally been recalcitrant to this mode of gene transfer. Hiei et al., The Plant Journal 6: 271-282 (1994); and U.S. Pat. No. 5,591,616 to Hiei et al. Several methods of plant transformation, collectively referred to as direct gene transfer, have been developed as alternatives to *Agrobacterium*-mediated transformation.

One generally applicable method of plant transformation is microprojectile-mediated transformation, wherein an expression vector is applied to the surfaces of 1 to 41 m diameter microprojectiles. The expression vector is then introduced into plant tissues with a biolistic device which accelerates the microprojectiles to velocities sufficient to penetrate plant cell walls and membranes of the tissues, e.g., 300 to 600 m/s. Sanford et al., Part. Sci. Technol. 5: 27 (1987); Sanford, Trends Biotech. 6: 299 (1988); Klein et al., Bio/Technology 6: 559-563 (1988); Sanford, Physiol Plant 79: 206 (1990); Klein et al., Biotechnology 10: 268 (1992); U.S. Pat. No. 5,550,318 to Adams et al.; U.S. Pat. No. 5,887,023 to Sautter et al; and U.S. Pat. Nos. 5,886,244 and 5,990,387 to Tomes et al. In maize, several target tissues can be bombarded with DNA-coated microprojectiles to produce transgenic, hence derived, plants, including, for example, callus (Type I or Type II), immature embryos, and meristematic tissue.

Another method for physical delivery of DNA to plants is sonication of target cells. Zhang et al., Bio/Technology 9: 996 (1991). Alternatively, liposome or spheroplast fusion may be used to introduce expression vectors into plants. Deshayes et al., EMBO J., 4: 2731 (1985); Christou et al., Proc Natl. Acad. Sci. U.S.A. 84: 3962 (1987), Direct uptake of DNA into protoplasts using $CaCl_2$ precipitation, polyvinyl alcohol or poly-L-ornithine has also been reported. Hain et al., Mol. Gen. Genet. 199: 161 (1985) and Draper et al., Plant Cell Physiol. 23: 451 (1982). Electroporation of protoplasts and whole cells and tissues has also been described. Donn et al., In Abstracts of VIIth International Congress on Plant Cell and Tissue Culture IAPTC, A2-38, p 53 (1990); D'Halluin et al., Plant Cell 4: 1495-1505 (1992); Spencer et al., Plant Mol. Biol. 24: 51-61 (1994); and U.S. Pat. No. 5,384,263 to Krzyzek et al., previously referenced.

Following transformation of maize target tissues, expression of the above-described selectable marker genes allows for preferential selection of transformed cells, tissues and/or plants, using regeneration and selection methods known to the art.

The foregoing transformation methods may be used to produce transgenic derived inbred lines of this invention. These transgenic inbred lines may then be crossed with another (non-transformed or transformed) inbred line to produce a transgenic hybrid maize plant. Alternatively, a genetic trait introgressed into a maize line using the foregoing transformation protocols may be transferred to another line using traditional backcrossing techniques known to the plant breeding art, e.g., backcrossing an engineered trait from a public, non-elite line into an elite line, or from a hybrid maize plant with a foreign transformed gene into an inbred line not containing that gene. As used herein, "crossing" can refer to a single cross or to the process of backcrossing.

13. INDUSTRIAL APPLICABILITY

Maize is used as human food, livestock feed, as raw materials in industry, and as a source of pigments. The food uses of maize, in addition to human consumption of maize kernels, include products of the dry-milling and wet-milling industries, as well as pigments for colorants. The principal products of maize dry milling are grits, meal and flour. The maize wet-milling industry provides maize starch, maize syrup, and dextrose for food use. Maize oil is recovered from maize germ, which is a by-product of both the dry-milling and wet-milling industries. By way of illustration, and not limitation, a cup (approximately 164 grams) of corn would be expected to have the following nutritional characteristics of Table I.

TABLE I

EXEMPLARY CONSTITUENTS PRESENT IN MAIZE

| Nutrient | Amount | Nutrient | Amount | Nutrient | Amount |
| --- | --- | --- | --- | --- | --- |
| calories | 177.12 | niacin equiv | 3.26 mg | alanine | 0.48 g |
| calories from fat | 18.90 | vitamin B6 | 0.10 mg | arginine | 0.22 g |
| calories from saturated fat | 2.90 | vitamin C | 10.16 mg | aspartate | 0.40 g |
| protein | 5.44 g | vitamin E alpha equiv | 0.14 mg | cystine | 0.04 g |
| carbohydrates | 41.18 g | vitamin E IU | 0.22 IU | glutamate | 1.06 g |
| carbohydrates | 41.18 g | vitamin E mg | 0.80 mg | glycine | 0.22 g |

TABLE I-continued

EXEMPLARY CONSTITUENTS PRESENT IN MAIZE

| Nutrient | Amount | Nutrient | Amount | Nutrient | Amount |
|---|---|---|---|---|---|
| soluble fiber | 0.18 g | folate | 76.10 mcg | histidine | 0.14 g |
| insoluble fiber | 4.42 g | vitamin K | 0.66 mcg | isoleucine | 0.22 g |
| sugar—total | 4.26 g | pantothenic acid | 1.44 mg | leucine | 0.58 g |
| monosaccharides | 1.32 g | calcium | 3.28 mg | lysine | 0.22 g |
| disaccharides | 2.78 g | copper | 0.08 mg | methionine | 0.12 g |
| fat—total | 2.10 g | magnesium | 52.48 mg | proline | 0.48 g |
| saturated fat | 0.32 g | manganese | 0.32 mg | serine | 0.26 g |
| monounsaturated fat | 0.62 g | phosphorus | 168.92 mg | threonine | 0.22 g |
| polyunsaturated fat | 0.98 g | potassium | 408.36 mg | tryptophan | 0.04 g |
| water | 114.10 g | selenium | 1.32 mcg | tyrosine | 0.20 g |
| ash | 1.18 g | sodium | 27.88 mg | valine | 0.30 g |
| vitamin A IU | 355.88 IU | zinc | 0.78 mg | | |
| vitamin A RE | 36.08 RE | 18:0 stearic | 0.02 g | | |
| A—carotenoid | 36.08 RE | 18:1 oleic | 0.62 g | | |
| A—beta carotene | 144.98 mcg | 18:2 linoleic | 0.96 g | | |
| thiamin—B1 | 0.36 mg | 18:3 linoleic | 0.02 g | | |
| riboflavin—B2 | 0.12 mg | omega 3 fatty acids | 0.02 g | | |
| niacin—B3 | 2.64 mg | omega 6 fatty acids | 0.96 g | | |

Maize, including both grain and non-grain portions of the plant, is also used extensively as livestock feed, primarily for beef cattle, dairy cattle, swine, and poultry. As will be shown, the grain and non-grain portions of the inbreds of this invention can be used as sources of pigments. These pigments can be used in, without limitation, foods, beverages, and cosmetics.

Industrial uses of maize include production of ethanol, maize starch in the wet-milling industry, and maize flour in the dry-milling industry. The industrial applications of maize starch and flour are based on functional properties, such as viscosity, film formation, adhesive properties, and abilities to suspend particles. Maize starch and flour have applications in paper and textile industries. Other industrial uses include adhesives, building materials, foundry binders, laundry starches, explosives, oil-well muds, and mining applications.

Plant parts other than the grain of maize are also used in industry. For example, stalks and husks are made into paper and wallboard and cobs are used for fuel and in making charcoal.

Hence, the seed of inbred maize line FAR601 or FAR045, the plant produced from the inbred seed, the hybrid maize plant produced from the crossing of the inbred, hybrid seed, and various parts of the hybrid maize plant and transgenic versions of the foregoing, can be utilized for human food, livestock feed, as a raw material in industry, or as a source of extracted pigments.

As previously indicated, the present invention relates to inbred lines of corn, including importantly plant parts and tissue of these inbred lines of corn, seed for such inbred lines, the use of the inbreds to produce hybrid corn plants, hybrid corn plants obtained using at least one of the inbreds as a parent and parts and tissue of these hybrid corn plants.

As used herein, the term "inbred," "inbred line" or "inbred lines" means a group of plants from a common ancestry which are essentially homozygous and which are true breeding, i.e., uniform and stable with respect to all of their agronomically important characteristics. In preferred embodiments, the inbred lines have the characteristics of the lines designated as FAR601 or FAR045. Generally, the preferred seeds of inbred corn lines in accordance with the invention, have the characteristics of the seeds of each of the designated lines.

Anthocyanins are plant-based polyphenolic pigments belonging to the class of molecules termed flavonoids. Consequently, anthocyanins are a very diverse group of compounds with a basic structure: anthocyanidin glycosidically linked to carbohydrate moieties and/or acyl groups. Anthocyanins commonly found in corn may include Cyanidin 3-glucoside, Cyanidin 3-(6"-malonylglucoside), Cyanidin 3-(6"-ethylmalonylglucoside), Cyanidin 3-(6"-dimalonylglucoside) (and other derivatives); Pelargonidin 3-glucoside, Pelargonidin 3-(6-malonylglucoside), Pelargonidin 3-(6"-ethylmalonylglucoside) (and other derivatives); Peonidin 3-glucoside, Peonidin 3-(6"-malonylglucoside), Peonidin 3-(6"-ethylmalonylglucoside) (and other derivatives); Cyanidin 3-galactoside (and derivatives); Cyanidin 3-rutinoside (and derivatives); and Petunidin 3-glucoside (and derivatives).

Anthocyanins are widely found in flowering plants, such as corn. These compounds are typically water soluble and non-toxic, displaying a range of colors from orange, bright red/purple to blue. Anthocyanins are polar molecules and, therefore, are more soluble in polar solvents. Solubility also depends on various conditions such as pH, temperature, type of solvent, and concentration. Extraction may use solvents such as water, methanol, ethanol, or mixtures thereof, optionally acidified with an acid (e.g., between about 0.001% and 0.01% HCl or citric acid).

Other useful compounds may be present in extracts from the inbreds of this invention and their hybrid, such as other flavonoids, phenolic acids, and carbohydrates. Exemplary flavonoids include (−)-Epicatechin, (−)-Epicatechin 3-gallate, (−)-Epigallocatechin, (−)-Epigallocatechin 3-gallate, (+)-Catechin, (+)-Gallocatechin. Exemplary phenolic acids include Ferulic acid and derivatives, Quercetin and derivatives, P-coumaric acid and derivatives, Protocatechuic acid and derivatives, Vanillic acid and derivatives, Hesperitin and derivatives, Hydroxycinnamic acid and derivatives, Gallic acid and derivatives. A nonlimiting recital of carbohydrates would include common sugars such as arabinose, rhamnose or galactose and/or with acylating acids.

14. DESCRIPTION OF MAIZE INBREDS FAR601 AND FAR045

Each of the inbred corn lines FAR601 and FAR045, as indicated, are substantially homozygous and can be reproduced by planting seed of the line, growing the resulting corn plants under self-pollination or sibbing with adequate isolation, and harvesting the resulting seed using techniques familiar to those of skill in the art. A hybrid of FAR601 and FAR 045 can be produced by growing the two inbreds in proximity, then detasseling one of the inbreds in this invention. Alternately, other methods of pollen control as more fully described herein can be used as well.

Each of the inbreds and their hybrid has shown uniformity and stability within the limits of environmental influence for each of the traits. Each of the instant inbreds and a three-way hybrid having the instant inbreds as two of its parents are described in Table IIA. A further description of the instant inbreds and their single cross hybrid are described in Table IIB. As also indicated below, each inbred has been either sib-pollinated or self-pollinated a sufficient number generations with careful attention paid to uniformity of plant type to ensure homozygosity and phenotypic stability.

TABLE IIA

MORPHOLOGICAL DESCRIPTION OF INBREDS
FAR601 AND FAR045 AND A THREE-WAY F1 HYBRID THEREOF

| UPOV | Characteristic | Male FAR601 | Female FAR045 | Single Cross Female FAR044*FAR045 |
|---|---|---|---|---|
| 1. | first leaf: anthocyanin coloration of sheet | 9 | 9 | 9 |
| 2. | first leaf: shape of tip | 5 | 4 | 4 |
| 3. | leaf: angle between blade and stem | 5 | 2 | 3 |
| 4. | attitude of blade | 5 | 3 | 4 |
| 5. | degree of zig-zag | 1 | 1 | 1 |
| 6. | stem: anthocyanin coloration at base of brace roots | 9 | 9 | 9 |
| 7. | time of anthesis | 4 | 4 | 4 |
| 8. | tassel: anthocyanin coloration at base of glume | 9 | 9 | 9 |
| 9. | tassel: anthocyanin coloration of glumes | 8 | 5 | 7 |
| 10. | tassel: anthocyanin coloration of anthers | 5 | 1 | 4 |
| 11. | tassel: density of spikelets | 3 | 3 | 3 |
| 12. | tassel: angle between main axis and lateral branches | 7 | 5 | 5 |
| 13. | tassel: attitude of lateral branches | 3 | 5 | 5 |
| 14. | tassel: number of lateral branches | 3 | 3 | 3 |
| 15. | ear: time of silk emergence | 4 | 4 | 4 |
| 16. | ear: anthocyanin coloration of silks | 9 | 3 | 9 |
| 17. | ear: intensity of anthocyanin coloration of silks | 4 | 1 | 3 |
| 18. | leaf: anthocyanin coloration of sheath | 9 | 1 | 9 |
| 19. | tassel: length of main axis above lowest side branches | 6 | 6 | 6 |
| 20. | tassel: length of main axis above highest side branches | 6 | 6 | 6 |
| 21. | tassel: length of side branches | 5 | 5 | 5 |
| 22. | plant: length | 6 | 6 | 7 |
| 23. | ear: height of insertion, relative to plant height | 5 | 4 | 5 |
| 24. | leaf: width of blade | 4 | 5 | 5 |
| 25. | ear: length of peduncle | 3 | 2 | 2 |
| 26. | ear: length | 4 | 5 | 6 |
| 27. | ear: diameter of ear | 4 | 4 | 5 |
| 28. | ear: shape | 2 | 2 | 2 |
| 29. | ear: number of rows of grain | 4 | 6 | 5 |
| 30. | ear: type of grain | 2 | 4 | 4 |
| 31. | ear: color of top of grain | 9 | 9 | 9 |
| 32. | ear: color of dorsal side of grain | 9 | 9 | 9 |
| 33. | ear: anthocyanin coloration of glumes of cob | 9 | 9 | 9 |
| 34. | ear: intensity of anthocyanin coloration of glumes of cob | 9 | 5 | 7 |

TABLE IIB

MORPHOLOGICAL DESCRIPTION OF INBREDS
FAR601 AND FAR045 AND THEIR SINGLE CROSS F1 HYBRID THEREOF

| UPOV | Characteristic | FAR045 | FAR601 | FAR045*FAR601 |
|---|---|---|---|---|
| 1 | first leaf: anthocyanin coloration of sheat | 9 | 9 | 9 |
| 2 | first leaf: shape of tip | 4 | 5 | 4 |
| 3 | leaf: angle between blade and steam | 2 | 5 | 3 |
| 4 | attitude of blade | 3 | 5 | 3 |
| 5 | degree of zig-zag | 1 | 1 | 1 |
| 6 | stem: anthocyanin coloration at base of brace roots | 9 | 9 | 9 |
| 7 | time of anthesis | 4 | 4 | 4 |
| 8 | tassel: anthocyanin coloration at base of glume | 9 | 9 | 9 |

TABLE IIB-continued

MORPHOLOGICAL DESCRIPTION OF INBREDS
FAR601 AND FAR045 AND THEIR SINGLE CROSS F1 HYBRID THEREOF

| UPOV | Characteristic | FAR045 | FAR601 | FAR045*FAR601 |
|---|---|---|---|---|
| 9 | tassel: anthocyanin coloration of glumes | 5 | 9 | 7 |
| 10 | tassel: anthocyanin coloration of anthers | 1 | 7 | 5 |
| 11 | tassel: density of spikelets | 3 | 3 | 3 |
| 12 | tassel: angle between main axis and lateral branches | 5 | 7 | 6 |
| 13 | tassel: attitude of lateral branches | 5 | 3 | 5 |
| 14 | tassel: number of lateral branches | 3 | 3 | 5 |
| 15 | ear: time of silk emergence | 4 | 4 | 4 |
| 16 | ear: anthocyanin coloration of silks | 1 | 9 | 9 |
| 17 | ear: intensity of anthocyanin coloration of silks | no | 5 | 5 |
| 18 | leaf: anthocyanin coloration of sheath | 2 | 9 | 7 |
| 19 | tassel: length of main axis above lowest side branch | 6 | 6 | 7 |
| 20 | tassel: length of main axis above highest side branch | 6 | 6 | 7 |
| 21 | tassel: length of side branches | 6 | 6 | 7 |
| 22 | plant: length | 6 | 6 | 7 |
| 23 | ear: height of insertion, relative to plant height | 4 | 5 | 5 |
| 24 | leaf: width of blade | 5 | 4 | 6 |
| 25 | ear: length of peduncle | 3 | 3 | 3 |
| 26 | ear: length | 5 | 4 | 6 |
| 27 | ear: diameter of ear | 4 | 4 | 5 |
| 28 | ear: shape | 2 | 2 | 2 |
| 29 | ear: number of rows of grain | 6 | 4 | 6 |
| 30 | ear: type of grain | 4 | 3 | 4 |
| 31 | ear: color of top of grain | 8 | 9 | 9 |
| 32 | ear: color of dorsal side of grain | 7 | 9 | 9 |
| 33 | ear: anthocyanin coloration of glumes of cob | 9 | 9 | 9 |
| 34 | ear: intensity of anthocyanin coloration of glumes of cob | 5 | 9 | 8 |

The data present in Tables IIA and IIB represent 34 morphological traits associated with the Table of Characteristics published by the International Union for the Protection of New Varieties of Plants (UPOV). The data for Table IIA were gathered in Portugal during the 2006 growing season. The data for Table IIB were also gathered in Portugal, but during the 2007 growing season. In each case, the data represent ratings of a person of skill in the art without resorting to the reference inbreds specified in the UPOV publication Guidelines for the Conduct of Tests for Distinctness, Uniformity and Stability, TG/2/6, UPOV (1999). A more detailed description of these traits can be found in Guidelines for the Conduct of Tests for Distinctness, Uniformity and Stability, TG/2/6, UPOV (1999).

As can be seen in the data of Tables IIA and IIB, each of the inbred varieties and hybrids therefrom exhibits characteristic unusual strong red coloration in plant parts and tissue, including stems, leaves, glumes of cob and base of brace roots.

Tables IIIA and IIIB show the history of development for each of the inbred lines, each of which represents at least six to seven inbreeding generations.

TABLE IIIA

INBRED LINE DEVELOPMENT AND GENEOLOGY OF FAR601
Line: FAR601 - Breeding History

| Cycle | Country** | Plot | Selfing stage | Activity |
|---|---|---|---|---|
| 2006/7 | AR | 06AC691049+50 | S7 to S8 | LM* and breeder seed production |
| 2006 | PT | 06AC090155/01+2 | S6 to S7 | inbred fixation |
| 2005/6 | NZ | 05NZ-302/n | S5 to S6 | inbred fixation |
| 2004/5 | NZ | 04AR-151-54 | S4 to S5 | inbred fixation |
| 2004 | FR | IN04-132/n# | S4# | inbred fixation |
| 2003/4 | NZ | 03NZ-14/3 | S3 to S4 | inbred fixation |

TABLE IIIA-continued

INBRED LINE DEVELOPMENT AND GENEOLOGY OF FAR601
Line: FAR601 - Breeding History

| Cycle | Country** | Plot | Selfing stage | Activity |
|---|---|---|---|---|
| 2003/3 | CL | 02CL-FM-25/1 | S2 to S3 | inbred fixation |
| 2002 | HU | 02HU5723/2 | S1 to S2 | inbred fixation |
| 2001/2 | CL | 01CL-FM14/1 | S0 to S1 | inbred fixation |
| 2001 | DE | Rhine valley spontaneous red corn segregate as S0 | | |

*LM Line Maintenance;
**AR Argentina, PT Portugal, HU Hungary, CL Chile, DE Germany, NZ New Zealand, FR France

TABLE IIIB

INBRED LINE DEVELOPMENT AND GENEOLOGY OF FAR045
Line: FAR045 - Breeding History

| Cycle | Country** | Plot | Selfing stage | Activity |
|---|---|---|---|---|
| 2006/7 | AR | 06FM691002 | S7 to S8 | LM* and breeder seed production |
| 2006 | PT | 06FM09007 | S6 to S7 | inbred fixation |
| 2005/6 | NZ | 05NZ-305-02 | S5 to S6 | inbred fixation |
| 2004/5 | NZ | 04AR-165/1 | S4 to S5 | inbred fixation |
| 2004 | FR | IN04-145/2 | S4 to S5 | inbred fixation |
| 2002 | HU | 02HU-5188/3 | S3 to S4 | inbred fixation |
| 2001 | HU | 01HU-4010/1 | S2 to S3 | inbred fixation |
| 2000/1 | NZ | 00NZ-06/1 | S1 to S2 | inbred fixation |
| 2000 | HU | 00HUFM-5287/6 | S0 to S1 | inbred fixation |
| 1999 | DE | Rhine valley spontaneous red corn cross into elite germplasm | | |

*LM Line Maintenance;
**AR Argentina, PT Portugal, HU Hungary, CL Chile, DE Germany, NZ New Zealand, FR France One aspect of the invention provides novel corn inbreds FAR601 and FAR045 as red-pigmented corn inbreds with superior characteristics providing excellent male and/or female parental lines for producing $F_1$ corn hybrids also having excellent characteristics. It will be appreciated that the invention is intended to cover both inbred and hybrid plants and parts (tissues or cells) thereof. This includes any plant parts and tissues acceptable for use in extracting pigments present therein as well as for other uses described herein.

As seen in Table IIIA, line FAR601 was derived from Rhine Valley spontaneous red corn segregate commonly available in Germany and was inbred using pedigree breeding for seven generations. Inbred FAR601 is uniform and stable and appears to be homozygous for all characteristics.

As seen in Table IIIB, line FAR045 was derived from a cross of a spontaneous red corn into elite germplasm, then developed by self-pollination of successive inbreeding generations, accompanied by selection in a pedigree breeding program over 8 generations. Line FAR045 has been observed to be uniform and stable and appears to be homozygous for all agronomic characteristics.

A. Working Example 1

One acre of the hybrid of FAR045*FAR601 was grown near Lamberton, Minn. in 2006. The grain yield, adjusted to 15.5% moisture at harvest and expressed at 56 pounds per bushel, was 120 bushels per acre.

B. Working Example 2

The hybrid FAR045*FAR601 was grown near Lamberton, Minn. in 2005 and 2006. Tissues from representative plants were sampled to determine anthocyanin concentrations extracted from each tissue. The plants were harvested near the black layer stage of maturity (late silage stage) on Sep. 30, 2005 and Oct. 1, 2006. In each year, samples from the tissues, termed grain, husk, cob, leaf, and stalk, were taken, chopped by hand and air dried at about 50 degrees Centigrade. The samples were then ground in a Waring Blender, then further ground in a Retsch Mill. The ground samples were subsequently immersed in an extraction solution or solvent (50:50 water:ethanol, by volume having 0.1M HCl) and stirred or agitated at about 37 degrees Centigrade. After about 1.5 hours of agitation in the extraction solution, the resulting slurry was filtered through a nylon mesh screen, then through #4 filter paper and assayed for proportion of anthocyanins present. The portions of hybrid plants were then assayed for anthocyanin content, the results being shown in Table IV.

TABLE IV

Anthocyanin Proportions of Plant Tissues for Hybrid FAR045 × FAR601

| Trait | Plant Tissue | | | | | |
|---|---|---|---|---|---|---|
| | Grain | Husk | Cob | Leaf | Stalk | Total |
| 2006 | | | | | | |
| Total mass | 51% | 8% | 7% | 9% | 25% | 100% |
| Lab pigment (% of mass) | 0.22% | 4.01% | 0.69% | 0.06% | 0.27% | 5.2% |
| Harvested mass (tons) | 2.8 | 0.4 | 0.4 | 0.5 | 1.4 | 5.5 |
| Lab pigment (lbs) | 12.3 | 34.1 | 5.6 | 0.6 | 7.6 | 59.9 |
| Lab pigment (% of total) | 21% | 57% | 9% | 1% | 13% | 100% |
| 2005 | | | | | | |
| Total mass | 54% | 7% | 7% | 8% | 24% | 100% |
| Lab pigment (% of mass) | 0.166% | 3.210% | 1.240% | 0.100% | 0.459% | 5.2% |
| Harvested mass (tons) | 2.8 | 0.4 | 0.4 | 0.2 | 0.6 | 4.3 |
| Lab pigment (lbs) | 9.4 | 23.8 | 8.9 | 0.4 | 5.1 | 47.7 |
| Lab pigment (% of total) | 20% | 50% | 19% | 1% | 11% | 100% |

In 2006 a greater amount, and percentage, of pigment was present. However, in both years most of the anthocyanin extracted was from the husk leaves, followed by that from the grain. Other significant amounts of anthocyanin were obtained from the cob and stalk tissues and very little from the leaves.

C. Working Example 3

The inbreds FAR045 and FAR601 were assayed by Bio-Diagnostics, Inc., River Falls, Wis., for isozyme genotype using methods known to a person of ordinary skill in the art, e.g., protocols described by Stuber et al, "Techniques and Scoring Procedures for Starch Gel Electrophoresis of Enzymes from Maize (*Zea mays* L.)," Technical Bulletin #286, North Carolina Agricultural Research Service, North Carolina State University, Raleigh, N.C. (1988). The results of this assay are shown in Table V.

TABLE V

| ISOZYME GENOTYPES OF FAR045 AND FAR601 | | | | | | | |
|---|---|---|---|---|---|---|---|
| Variety | ADH1 | ACP1 | AMP1 | AMP3 | GLU1 | IDH1 | IDH2 | MDH1 |
| FAR045 | 4/4 | 2/2 | 4/4 | 4/4, 4/5, 5/5 | 7/7 | 4/4 | 6/6 | 1/1, 1/6, 6/6 |
| FAR601 | 4/4 | 4/4 | 4/4 | 3/3 | 7/7 | 4/4 | 4/4 | 6/6 |
| Variety | MDH2 | MDH3 | MDH4 | MDH5 | PDG1 | PDG2 | PGM1 | PGM2 |
| FAR045 | 3/3 | 16/16 | 12/12 | 12/12 | 3.8/3.8 | 5/5 | 9/9 | 4/4 |
| FAR601 | 6/6 | 16/16 | 12/12 | 12/12 | 3.8/3.8 | 5/5 | 9/9 | 4/4 |

The inbreds FAR045 and FAR601 had differing alleles for ACP1, AMP3, IDH2, AMP3, and MDH2. FAR045 was segregating at AMP3 with two alleles present showing the expected two homozygotes and the single heterozygote. However, a person of ordinary skill in the art will readily recognize that FAR045 could be selected for homozygous individuals at the AMP3 locus to thereby identify individuals breeding true for either of the alleles found. A person of ordinary skill in the art will also recognize that other FAR045 and FAR601 plants may have other isozyme genotypes and nonetheless be within the spirit and scope of this invention.

D. Working Example 4

The composition of the seeds (kernels) of the inbreds FAR601, FAR045, their hybrid and another hybrid having a different, single cross female inbred parent, FAR045*FAR044 was determined. In each case, the male (pollen) parent was FAR601. The results of this assay are shown in Table VI.

TABLE VI

KERNEL COMPOSITIONS OF INBREDS FAR045 AND FAR601 AND THE HYBRIDS FAR045*FAR601 AND FAR045*FAR044)(FAR601
Composition - Kernels

| | Oven Moisture (ground) | Oil (oil-ether extraction) | Protein | Starch |
|---|---|---|---|---|
| FAR045*FAR601 | 9.81% | 4.34% | 10.13% | 74.1% |
| FAR045*FAR044)(FAR601 | 10.75% | 4.18% | 10.06% | 73.2% |

TABLE VI-continued

KERNEL COMPOSITIONS OF INBREDS FAR045 AND FAR601 AND THE HYBRIDS FAR045*FAR601 AND FAR045*FAR044)(FAR601
Composition - Kernels

| | Oven Moisture (ground) | Oil (oil-ether extraction) | Protein | Starch |
|---|---|---|---|---|
| FAR601 | 12.93% | 4.90% | 11.08% | 70.1% |
| FAR045 | 10.98% | 3.76% | 12.48% | 67.2% |

Kernels of the two hybrids and two inbreds were as expected for oil and starch percentages, but were higher than expected for protein percentages, based on yellow dent corn grades encountered in the upper Midwest of the United States. See, e.g., Corn: Chemistry and Technology, Stanley A. Watson and Paul E. Ramstad Editors, American Association of Cereal Chemists, Inc., St. Paul, Minn. (1987), page 72, Table IV.

E. Working Example 5

Grain from the inbreds FAR045 and FAR601 and from the hybrid FAR045*FAR601 was extracted using water:acetic acid:acetonitrile:trifluoroacetic acid (V/V) at respective ratios 848:100:50:2. The kernels were extracted for six hours at ambient temperature, then stored at a temperature of about 35 degrees F. for about three days, then filtered. The extract was then subjected to high performance liquid chromatography to determine proportions of anthocyanin constituents and compared to the results of Working Example 6 below. Results of this assay are presented in Table VII.

TABLE VII

| ANTHOCYANIN COMPONENTS OF FAR045, FAR601, AND FAR045*FAR601 | | | | | | | |
|---|---|---|---|---|---|---|---|
| | | | % Area (080429 MPA Extraction) | | | % Area by Brunswick | | |
| peak no. | Anthocyanin | Ret Time | FAR045* FAR601 | FAR601 | FAR045 | FAR045* FAR601 | peak no. | Ret Time |
| 1 | cyanidin 3-glucoside | 11.0 | 35.4 | 29.06 | 9.51 | 25.7 | 1 | 10.7 |
| 2 | Unknown | 14.8 | 1.12 | 0.99 | | | | |
| 3 | Unknown | 16.1 | 1.30 | 1.00 | 1.13 | | | |
| 4 | Unknown | 16.7 | 2.29 | 1.03 | | | | |
| 5 | cyanidin 3-(6"-malonoyl)galactoside | 17.5 | 5.98 | 6.27 | 5.96 | 5.2 | 2 | 17.7 |
| 6 | peonidin 3-glucoside | 19.9 | 4.17 | 4.03 | | 3.4 | 3 | 20.7 |
| 7 | cyanidin 3-(6"-malonoyl)glucoside | 22.0 | 32.37 | 33.22 | 35.73 | 42.4 | 4 | 24.4 |
| 8 | cyanidin 3-(malonoyl)(malonoyl)galactoside | 26.0 | 1.05 | 1.25 | 17.61 | 2.8 | 5 | 30.6 |
| 9 | pelargonidin 3-(malonoyl)glucoside | 26.7 | 1.21 | 1.44 | 2.50 | 2.0 | 6 | 32.2 |
| 10 | Unknown | 27.4 | 2.17 | 1.29 | | | | |

TABLE VII-continued

ANTHOCYANIN COMPONENTS OF FAR045, FAR601, AND FAR045*FAR601

| peak no. | Anthocyanin | Ret Time | FAR045* FAR601 | % Area (080429 MPA Extraction) FAR601 | FAR045 | % Area by Brunswick FAR045* FAR601 | peak no. | Ret Time |
|---|---|---|---|---|---|---|---|---|
| 11 | cyanidin 3-(malonoyl)(malonoyl)glucoside | 28.3 | 5.76 | 9.19 | 21.13 | 7.6 | 7 | 33.6 |
| 12 | peonidin 3-(malonoyl)galactoside | 30.2 | 3.63 | 4.29 | | 4.2 | 8 | 35.8 |
| | peonidin 3-(malonoyl)glucoside | | | | | 3.1 | 9 | 36.8 |
| 13 | pelargonidin 3-(malonoyl)(malonoyl)glucoside | 34.3 | 0.49 | 0.49 | | 0.6 | 10 | 38.5 |
| 14 | cyanidin 3-(malonoyl)(succinoyl)galactoside | 35.8 | 0.60 | 1.22 | 0.73 | 1.1 | 11 | 39.0 |
| | peonidin 3-(malonoyl)(malonoyl)glucoside | | | | | 0.8 | 12 | 39.5 |
| | cyanidin 3-(malonoyl)(succinoyl)glucoside | | | | | 0.6 | 13 | 39.9 |
| | peonidin 3-(succinoyl)glucoside | | | | | 0.3 | 14 | 40.6 |
| | Total | | 97.54 | 94.77 | 94.30 | 99.8 | | |
| | Total % Non Acylated | | 39.57 | 33.09 | 9.51 | 29.10 | | |
| | Total % Acylated | | 60.43 | 66.91 | 90.49 | 70.90 | | |
| | Total Peaks | | 19 | 33 | 11 | 14 | | |
| | Total Area (relative concentration of Anthocyanin) | | 11000 | 54750 | 1570 | | | |
| | Injection Volume ul | | 20 | 20 | 100 | | | |

These results confirm that FAR601 produces very high amounts of anthocyanins which may be extracted using only water as a solvent. While having a darkly red pigment, which is almost as intense at that of FAR601, FAR045 produces a lower amount of water-extractible anthocyanins. By way of illustration and not limitation, it is presently postulated that acylated anthocyanins are less soluble in water and may be more tightly bound to plant tissues or plant cell components. Consequently, the higher concentrations of acylated anthocyanins present in FAR045 may result in the lower anthocyanin concentrations present in the extracts from this inbred.

F. Working Example 6

Kernels from hybrids FAR045*FAR601 and FAR045*FAR044)(FAR601 and the variety Kculli were assayed for anthocyanin content and constituents by Brunswick Laboratories, Norton, Mass. The assay compositions were extracted from corn (maize) grain samples harvested in 2006 and 2007 and from the cultivar Kculli. The protocol included a first extraction of 40 pounds (dry weight) of whole kernel corn using 60 pounds of deionized water at a low shear mixing action at 60 degrees Celsius for 1.5 hours. No other ingredients were present in the extracting solution other than deionized water. The solution was then filtered from the corn and set aside. Another 60 pounds of deionized water was then added to the corn at low shear mixing at 60 degrees Celsius for another 1.5 hours. The solution was then filtered from the corn and combined with the first extraction. The combined extracting solutions were then passed through a series of progressively smaller filters ending with a 1 micron filter, at which point very little additional solid material could be filtered. The solution was then tested for percent solids (typically 0.4-0.6 percent) and anthocyanin activity (typically 90-110 milligrams per liter). The filtered solution was evaporated approximately 100 times to a concentration of 40-60 percent solids and stabilized. In the case where the yield was one pound (454 grams) solids colorant, 50.4 grams of a 50 percent solution of citric acid in deionized water was added to stabilize the product. The amount added was 10 percent citric acid solution to a total citric acid solution and colorant. Anthocyanin constituents were then determined by high performance liquid chromatography and are presented in Table VIII. Total anthocyanin concentrations in the extract are shown in Table IX.

TABLE VIII

ANTHOCYANIN CONSTITUENTS OF FAR045*FAR601, FAR045*FAR044)(FAR601, AND THE CULTIVAR KCULLI

| | % anthocyanin | | |
|---|---|---|---|
| Anthocyanin | FAR045*FAR044)(FAR601 | FAR045* FAR601 | Kculli* |
| cyanidin 3-glucoside | 13.7 | 25.7 | 43.1 |
| cyanidin 3-(6"-malonoyl)galactoside | 7.2 | 5.2 | 1.7 |
| peonidin 3-glucoside | 2.5 | 3.4 | 5.7 |
| cyanidin 3-(6"-malonoyl)glucoside | 38.1 | 42.4 | 31.6 |
| cyanidin 3-(malonoyl)(malonoyl)galactoside | 4.3 | 2.8 | 1.4 |

TABLE VIII-continued

ANTHOCYANIN CONSTITUENTS OF FAR045*FAR601, FAR045*FAR044)(FAR601, AND THE CULTIVAR KCULLI

| | % anthocyanin | | |
|---|---|---|---|
| Anthocyanin | FAR045*FAR044)(FAR601 | FAR045* FAR601 | Kculli* |
| pelargonidin 3-(malonoyl)glucoside | 4.0 | 2.0 | 2.7 |
| cyanidin 3-(malonoyl)(malonoyl)glucoside | 13.4 | 7.6 | 2.1 |
| peonidin 3-(malonoyl)galactoside | 5.5 | 4.2 | 4.4 |
| peonidin 3-(malonoyl)glucoside | 3.5 | 3.1 | 4.3 |
| pelargonidin 3-(malonoyl)(malonoyl)glucoside | 2.0 | 0.6 | 0.4 |
| cyanidin 3-(malonoyl)(succinoyl)galactoside | 2.1 | 1.1 | 0.9 |
| peonidin 3-(malonoyl)(malonoyl)glucoside | 2.0 | 0.8 | 0.5 |
| cyanidin 3-(malonoyl)(succinoyl)glucoside | 1.2 | 0.6 | 0.7 |
| peonidin 3-(succinoyl)glucoside | 0.5 | 0.3 | 0.6 |

Essential Living Foods, Santa Monica, CA 90401.

TABLE IX

TOTAL ANTHOCYANIN CONCENTRATIONS OF FAR045*FAR044)(FAR601, FAR045*FAR601, AND KCULLI

| Corn Hybrid or Variety | Total Anthocyanin (mg/g) |
|---|---|
| FAR045*FAR044)(FAR601 | 25.4 |
| FAR045*FAR601 | 34.9 |
| KCulli | 52.0 |

G. Working Example 7

Ground isolated pericarp of the hybrid FAR045*FAR601 was extracted using water, heat and agitation, then filtered and concentrated approximately 10 fold using roto-evaporation. The analysis is presented in Table X.

TABLE X

FAR045*FAR601 PERICARP CONSTITUENTS

| Total Anthocyanins | 0.5-4% |
|---|---|
| Ash | 1-4% |
| Fat | 0.5-4% |
| Protein | 0.5-4% |
| Carbohydrates | 10-30% |
| Moisture | 54-87% |

*Anthocyanin calculation based on cyanidin-3-glucoside.
*Composition analysis performed by Food Safety Net Services in San Antonio, TX

H. Working Example 8

Anthocyanins were extracted from seeds of FAR045, FAR601, and the hybrid FAR045*FAR601 by the extraction protocol of Working Example 6. Percent activity in terms of absorbance as measured by a spectrophotometer at 510 nm and as based on the dry weight of the corn kernels. The results of this assay are shown in Table XI.

TABLE XI

PERCENT ACTIVITY OF EXTRACTS OF INBRED FAR601 AND HYBRID FAR045*FAR601

Percent Activity

| | % Activity |
|---|---|
| FAR045*FAR601 | 0.0271% |
| FAR601 | 0.1110% |

The aqueous protocol failed to extract sufficient quantities of anthocyanins from FAR045. Accordingly, the assay could not be conducted for extracts of FAR045 and no results are shown for this inbred. These results show that FAR601 has high amounts of aqueously extractable anthocyanins, higher than the hybrid FAR045*FAR601.

15. DEPOSITS

Applicant has made a deposit of at least 2500 seeds of Inbreds FAR045 and FAR601 with the American Type Culture Collection (ATCC), Manassas, Va. 20110 USA, ATCC Deposit Nos. PTA-9274 and PTA-9275, respectively. The seeds deposited with the ATCC on Jun. 19, 2008 were taken from the deposit maintained by Red Rock Genetics, LLC, 41295 County Road 54, Lamberton, Minn. 56152 since prior to the filing date of this application.

Access to these deposits will be available during the pendency of the application to the Commissioner of Patents and Trademarks and persons determined by the Commissioner to be entitled thereto upon request. Upon allowance of any claims in the application, the Applicant will make the deposit available to the public pursuant to 37 C.F.R. §1.808. These deposits of the Inbreds FAR045 and FAR601 will be maintained in the ATCC depository, which is a public depository, for a period of 30 years, or 5 years after the most recent request, or for the enforceable life of the patent, whichever is longer, and will be replaced if either becomes nonviable during that period. Additionally, Applicant has satisfied all the requirements of 37 C.F.R. §§1.801-1.809, including providing an indication of the viability of the samples upon deposit. Applicant has no authority to waive any restrictions imposed by law on the transfer of biological material or its transportation in commerce. Applicant does not waive any infringement of Applicant's rights granted under this patent.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A seed of a corn cultivar designated FAR045, representative seed of said cultivar deposited under ATCC Accession Number PTA-9274.

2. A corn plant, or a regenerable part thereof, produced by growing the seed of claim 1.

3. A tissue culture of regenerable cells produced from the plant of claim 2.

4. A protoplast produced from the tissue culture of claim 3.

5. The tissue culture of claim 3, wherein cells of the tissue culture are from a plant part selected from the group consisting of a leaf, a pollen grain, an embryo, a root, a root tip, an anther, a pistil, an inflorescence, a seed, and a stem.

6. A corn plant regenerated from the tissue culture of claim 3, said plant having all the morphological and physiological characteristics of corn cultivar FAR045, representative seed of said cultivar deposited under ATCC Accession Number PTA-9274.

7. A method for producing a hybrid corn seed wherein the method comprises crossing the plant of claim 2 with a different corn plant and harvesting the resultant hybrid corn seed.

8. A hybrid corn seed produced by the method of claim 7.

9. A hybrid corn plant produced by growing the hybrid seed of claim 8.

10. A method of producing an herbicide resistant corn plant wherein the method comprises transforming the corn plant of claim 2 with a transgene that confers herbicide resistance.

11. An herbicide resistant corn plant produced by the method of claim 10.

12. The corn plant of claim 11, wherein the transgene confers resistance to an herbicide selected from the group consisting of imidazolinone, sulfonylurea, glyphosate, glufosinate, L-phosphinothricin, triazine and benzonitrile.

13. A method of producing an insect resistant corn plant wherein the method comprises transforming the corn plant of claim 2 with a transgene that confers insect resistance.

14. An insect resistant corn plant produced by the method of claim 13.

15. The corn plant of claim 14 wherein the transgene encodes a *Bacillus thuringiensis* endotoxin.

16. A method of producing a disease resistant corn plant wherein the method comprises transforming the corn plant of claim 2 with a transgene that confers disease resistance.

17. A disease resistant corn plant produced by the method of claim 16.

18. A method of introducing a desired trait into corn cultivar FAR045 wherein the method comprises: crossing FAR045 plants grown from FAR045 seeds seed, representative seed of which has been deposited under ATCC Accession Number PTA-9274, with plants of another corn line that comprise a desired trait to produce progeny plants, wherein the desired trait is selected from the group consisting of male sterility, herbicide resistance, insect resistance and disease resistance; selecting progeny plants that have the desired trait to produce selected progeny plants; crossing the selected progeny plants with the FAR045 plants to produce backcross progeny plants; selecting for backcross progeny plants that have the desired trait and the other physiological and morphological characteristics of corn cultivar FAR045 to produce selected backcross progeny plants; and repeating said crossing and selecting for backcross progeny plants steps at least three times in succession, or, when using molecular markers, repeating said crossing and selecting at least once and selfing said backcross progeny plants at least once, to produce respective selected fourth or higher backcross progeny plants or second-selfed backcross progeny plants that comprise the desired trait and essentially all of the other physiological and morphological characteristics of corn cultivar FAR045.

19. A plant produced by the method of claim 18, wherein the plant has the desired trait and physiological and morphological characteristics of corn cultivar FAR601 as determined at the 5% significance level when grown in the same environmental conditions.

20. The plant of claim 19 wherein the desired trait is herbicide resistance and the resistance is conferred to an herbicide selected from the group consisting of imidazolinone, sulfonylurea, glyphosate, glufosinate, L-phosphinothricin, triazine and benzonitrile.

21. The plant of claim 19 wherein the desired trait is insect resistance and the insect resistance is conferred by a transgene encoding at least a portion of a *Bacillus thuringiensis* endotoxin.

22. A process of developing a corn variety, comprising sequentially inbreeding segregating generations of a corn hybrid having the plant of claim 2 as a parent until an advanced generation is attained, said advanced generation being F5 or greater and developing a corn variety.

23. The process of claim 22, in which inbreeding includes self-pollination.

24. A process of extracting anthocyanin, comprising immersing a plant part from the plant of claim 2 in a solvent to thereby extract anthocyanin from said plant part.

25. The process of claim 24, wherein said solvent is aqueous.

26. The process of claim 24, further comprising agitating said immersed plant part.

* * * * *